(12) United States Patent
Hoffmann

(10) Patent No.: US 11,063,775 B2
(45) Date of Patent: *Jul. 13, 2021

(54) EFFICIENT AND DYNAMIC SUPPORT OF MOBILE LOW LATENCY SERVICES

(71) Applicant: NOKIA SOLUTIONS AND NETWORKS OY, Espoo (FI)

(72) Inventor: Klaus Hoffmann, Munich (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 16/867,744

(22) Filed: May 6, 2020

(65) Prior Publication Data

US 2020/0267007 A1    Aug. 20, 2020

Related U.S. Application Data

(62) Division of application No. 16/332,232, filed as application No. PCT/EP2017/072763 on Sep. 11, 2017, now Pat. No. 10,686,614.

(30) Foreign Application Priority Data

Sep. 9, 2016  (EP) ..................... 16188099

(51) Int. Cl.
*H04L 12/14* (2006.01)
*H04L 12/715* (2013.01)
(Continued)

(52) U.S. Cl.
CPC .......... *H04L 12/1403* (2013.01); *H04L 12/14* (2013.01); *H04L 45/64* (2013.01);
(Continued)

(58) Field of Classification Search
CPC ..... H04L 12/1403; H04L 12/14; H04L 45/64; H04L 49/252; H04W 4/38; H04W 4/24;
(Continued)

(56) References Cited

U.S. PATENT DOCUMENTS 8,874,305 B2   10/2014  Dolgov et al.
9,201,421 B1   12/2015  Fairfield et al.
(Continued)

FOREIGN PATENT DOCUMENTS

WO     2016/028314 A1    2/2016

OTHER PUBLICATIONS

Korean Office Action corresponding to KR Appln. No. 10-2019-7009995, dated Apr. 1, 2020.
(Continued)

*Primary Examiner* — Diane D Mizrahi
(74) *Attorney, Agent, or Firm* — Squire Patton Boggs (US) LLP

(57) ABSTRACT

A method and apparatus for efficient and dynamic support of mobile low latency services including maintaining, by a control plane entity of an inter mobile device information exchange service hosting management functionality for said service, information on a plurality of participants of said service in a service area. A forwarding rule indicative of forwarding messages related to said service from a sender participant of said plurality of participants to a receiver participant of said plurality of participants is generated based on said information on said plurality of participants of said service in said service area. The forwarding rule is transmitted to a user plane entity of said service, and said user plane entity is located in a connection path between said control plane entity and said first participant of said service and in a connection path between said control plane entity and said second participant of said service.

18 Claims, 18 Drawing Sheets

(51) Int. Cl.
  *H04L 12/947* (2013.01)
  *H04M 15/00* (2006.01)
  *H04W 4/24* (2018.01)
  *H04W 4/38* (2018.01)
  *H04W 4/40* (2018.01)
  *H04W 4/70* (2018.01)
  *H04W 4/021* (2018.01)
(52) U.S. Cl.
  CPC .......... *H04L 49/252* (2013.01); *H04M 15/00* (2013.01); *H04M 15/31* (2013.01); *H04W 4/24* (2013.01); *H04W 4/38* (2018.02); *H04W 4/021* (2013.01); *H04W 4/40* (2018.02); *H04W 4/70* (2018.02)
(58) Field of Classification Search
  CPC ......... H04W 4/70; H04W 4/021; H04W 4/40; H04M 15/00; H04M 15/31
  See application file for complete search history.

(56) References Cited

U.S. PATENT DOCUMENTS

| | | | |
|---|---|---|---|
| 9,791,861 B2 | 10/2017 | Keohane et al. | |
| 10,686,614 B2* | 6/2020 | Hoffmann | H04L 45/64 |
| 2013/0278631 A1 | 10/2013 | Border et al. | |
| 2016/0260328 A1 | 9/2016 | Mishra et al. | |
| 2017/0223516 A1 | 8/2017 | Raleigh | |
| 2019/0261203 A1 | 8/2019 | Raleigh | |

OTHER PUBLICATIONS

Notification of Reasons for Rejection (Non-Final) dated Feb. 17, 2020, corresponding to JP Appln. No. 2019-513323, and English translation thereof.

3GPP TR 22.885 V1.0.0 (Sep. 2015); 3rd Generation Partnership Project; Technical Specification Group Services and System Aspects; Study on LTE Support for V2X Services (Release 14); 42 pages.

ETSI TS 102 637-1 V1.1.1 (Sep. 2010); Intelligent Transport System (ITS); Vehicular Communications; Basic Set of Applications; Part 1: Functional Requirements; 60 pages.

International Search Report and Written Opinion dated Dec. 15, 2017, corresponding to International Patent Application No. PCT/EP2017/072763.

3GPP TR 22.885 V14.0.0 (Dec. 2015), Technical Report, 3rd Generation Partnership Project; Technical Specification Group Services and Systems Aspects; Study on LTE support for Vehicle to Everything (V2X) services (Release 14), Dec. 2015.

* cited by examiner

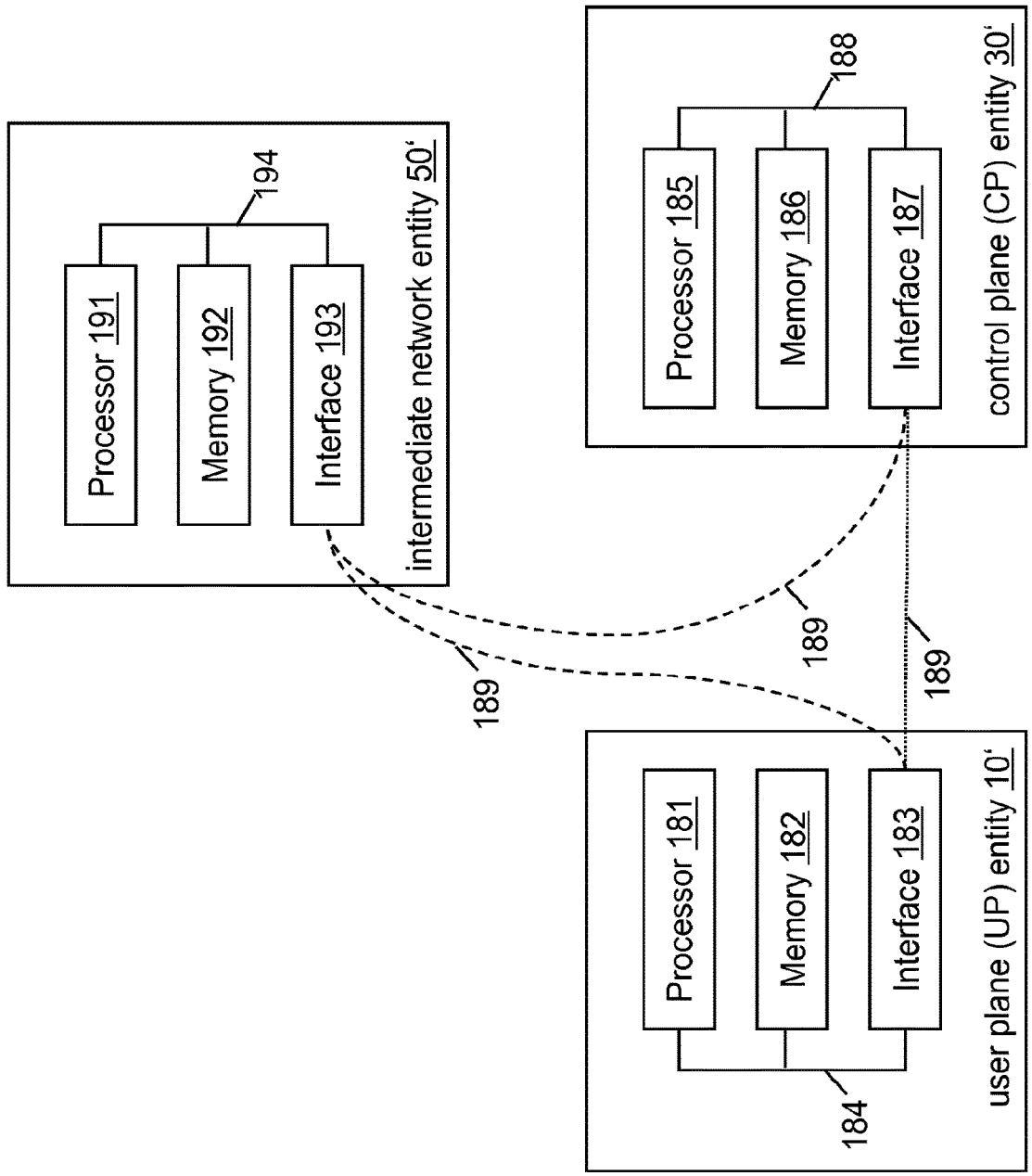

EFFICIENT AND DYNAMIC SUPPORT OF MOBILE LOW LATENCY SERVICES

CROSS REFERENCE TO RELATED APPLICATIONS

This application is a Divisional of co-pending U.S. patent application Ser. No. 16/332,232, filed on Mar. 11, 2019, which is the U.S. National Stage of PCT International Application No. PCT/EP2017/072763, filed on Sep. 11, 2017, which claims priority to European Application No. 16188099.2, filed on Sep. 9, 2016. The entire contents of the above-referenced applications is hereby incorporated by reference.

FIELD

The present invention relates to efficient and dynamic support of mobile low latency services. More specifically, the present invention exemplarily relates to measures (including methods, apparatuses and computer program products) for realizing efficient and dynamic support of mobile low latency services.

BACKGROUND

The present specification generally relates to ultra-low latency services which require ultra-low latency connection. Vehicle-to-X (V2X) communication is such ultra-low latency service, wherein V2X services include, for example, vehicle-to-vehicle and vehicle-to-pedestrians services.

While in the explanations below, reference is made to V2X as an example of ultra-low latency services to which the present application is applicable, the field of the present invention is not limited to V2X but instead also applicable to further ultra-low latency services such as, for example, gaming applications and "Broadband Access in a Crowd".

As mentioned above, V2X related services require ultra-low latency connection. For instance, according to 3$^{rd}$ Generation Partnership Project (3GPP) TR 22.885 "Study on LTE Support for V2X services", chapter 5.12 ("Pre-crash Warning"), a delay of less than 20 ms is required. Furthermore according to the Internet Engineering Task Force (IETF) draft "Deterministic Networking Use Cases Version 03" chapter 8.5 ("Vehicle to Vehicle"), the requirement is even given to be 5 ms for such services.

Accordingly, it is currently required for the V2X server application to run on the mobile edge computing (MEC) server, e.g., on the evolved NodeB (eNodeB, eNB) or distributed cloud/data centers (from a latency perspective still very close to the eNB site). Consequently the V2X server application either is to be deployed on every eNB, which is costly and also is scattered across the numerous eNB sites, or in clouds which are in terms of latency close-by. Anyhow, all the user plane traffic of the corresponding application is to be forwarded to the MEC (formerly known as radio applications cloud server (RACS)) platform and to the V2X application running on top of it.

Such approach, however, consumes forwarding capacity, which more and more will become a scarce resource in the future due to steadily increasing data amount. In the mentioned V2X scenario, according to such approach, the messages to be sent for instance from one vehicle to another vehicle are to be firstly sent up to the V2X server application for consideration, evaluation and decision as to where the particular message is to be sent. Only after this decision (of the V2X server application hosted on the MEC server) the corresponding message is forwarded to the vehicle addressed.

V2X capabilities may include "Warning to Pedestrian against Pedestrian Collision" (see e.g. 3GPP TR 22.885 "Study on LTE Support for V2X services"). In order to be able to avoid any collisions, special warning messages are to be exchange between the parties.

A corresponding exemplary scenario is depicted in FIG. 9, in which a vehicle 91 and a pedestrian 92, while not in the respective visible ranges, are heading (91a, 92a) for a collision. In order to enable the above warning against pedestrian collision, a message is to be transmitted from the vehicle to the pedestrian, as indicated by the curved arrow (93).

V2X capabilities may further include "Pre-crash Sensing Warning" between vehicles. This pre-crash sensing warning also requires that possibly intersecting cars are considered. In such case, at least two cars may possibly collide. Consequently, the corresponding warning messages need to be exchanged between (at least) these two cars. However, the two cars might be out of direct sight. Furthermore, these two cars might be attached to two different eNBs or radio access networks (e.g. 5G radio access networks (RAN)).

This means that an implementation in which application servers that only have "local" knowledge (i.e. knowledge limited to the "own" eNB) may not work in any case (namely, may not work at least in case the two cars are attached to two different eNBs). Further, in this context it should be considered that there may be a requirement according to which roaming is to be supported (see e.g. 3GPP TR 22.885 "Study on LTE Support for V2X services", chapter 5.21.5), which may be problematic in case of an implementation of the V2X server application on the eNB.

This further means that an implementation in which V2X communication is effected by means of a direct car to car communication may not work in any case (namely, may not reliably work under certain circumstances like weather conditions (e.g. fog) and topology blocking (e.g. buildings and shadowing by the buildings). Further, direct communication between cars and road units would require massive deployment of roadside equipment, which would be expensive.

As already mentioned, while the above has been described in the context of V2X requirements, a disposal of a substantial application regarding services, in particular ultra-low latency services, on the MEC site may raise similar problems as well. In particular, any MEC application may not be interested in all the traffic carried on e.g. the S1 interface.

Regarding vehicular communication like vehicle-to-vehicle (V2V) communication, it is noted that the corresponding server application may be hosted on the MEC server on the eNB in order to fulfil the ultra-low latency requirements, as mentioned above. Here, of course, at least challenges with respect to user equipment (UE) handover and relocation of respective server application may arise. Further, with such approach, the processing cost per bit can be expected to be high without centralized data center servers.

As long the ultralow latency requirements of V2X can be fulfilled, the MEC framework (and thus the server application) may be placed on local/distributed cloud center sites as well which are close enough to the eNB sites from the latency point of view (ultralow latency requirements).

However, according to ETSI TR 102 962 V1.1.1, V2X messages are to be sent to the cooperative intelligent transport system (C-ITS) server 101 (e.g. FIG. 10).

That is, all V2X messages are sent directly from the vehicle application to the V2X server application on the server (C-ITS) 101, which in return need to redistribute the communication to the vehicle side's application on the cars (102, 103) which are participating in this service.

Consequently, e.g. in Long Term Evolution (LTE) and/or 5G, there are two options for transmission of the V2X related messages.

Namely, on the one hand, the communication messages are all sent via the packet data network gateway (PGW, PDN-GW) or the corresponding gateway in the 5G network (or even the successor network) to the V2X server application (on the server in the data center) and back from the V2X server application (on the server in the data center) via the PGW to the V2X application in the car.

Further, on the other hand, the communication messages are sent to the MEC/RACS (deployed at the eNB) hosting such V2X server application and back to the V2X application in the car.

In this regard, it is noted that e.g. according to 3GPP TS23.203 ("Policy and charging control architecture"), the PGW or the corresponding gateway of the 5G architecture may embody the policy and charging enforcement function (PCEF), and an application function (AF) may be allowed to instruct the PCEF, as illustrated in FIG. 11.

FIG. 12 depicts an example with applications like the V2X server application hosted on the eNB due to the ultra-low latency requirements. The V2X server application receives the whole traffic (from radio side or core). Accordingly, the application/service payload (i.e. communication messages) is completely sent up to the e.g. V2X application and is forwarded back again towards the final destination.

With respect to the communication messages mentioned above, it is noted that according to ETSI TS 102 637-1 "Intelligent Transport Systems (ITS), Vehicular Communications, Basic Set of Applications, Part 1: Functional Requirements" (chapter 6.1.4.3 UC003 "Intersection collision warning"), collaborative/cooperative awareness messages (CAM) and possibly decentralized environmental notification messages (DENM) are sent to alert other vehicles about possible risks.

In ETSI EN 302 636-5-1 (Intelligent Transport Systems (ITS), Vehicular Communications, GeoNetworking, Part 5: Transport Protocols, Sub-part 1: basic transport protocol (BTP)), the V2X stage 3 transport protocol carrying the CAM and DENM messages is specified.

According thereto, within the BTP, the CAM and DENM message are distinguished by the respective ports as derivable from the following table. Details regarding these messages are derivable from the related standard mentioned as well in the table below.

| BTP port | ITS facilities layer entity | Related standard of ITS facilities layer entity |
|---|---|---|
| 2001 | CAM | EN 302 637-2 [i.3] |
| 2002 | DENM | EN 302 637-3 [i.4] |
| 2003 | TOPO | NA |
| 2004 | SPAT | NA |
| 2005 | SAM | TS 102 890-2 [i.5] |

As further prior art, proximity service (ProSe) is known, which is a device-to-device (D2D) communication technology. The discovery and connectivity procedure of ProSe is depicted in FIG. 13.

Applying principles of ProSe would entail that it may take about 10 s until the connectivity between two devices which are 150 m apart from each other is established. As such this D2D approach is not feasible and sufficient for the use case of intersection collision warning in the context of V2X. If, for example, both cars would move at a speed of 50 km/h on orthogonal streets, they may collide even before the connectivity between them would have been established. It is to be noted that in addition it might be questionable whether in urban areas connectivity within 150 m may be possible at all (e.g. due to shadowing).

Consequently, a solution is needed which overcomes the drawbacks and deficiencies of the known art discussed above.

In particular, the problem arises that known techniques do not provide ultra-low latency connection, is costly and requires scattered facilities, requires high processing power, and causes high traffic load.

Hence, there is a need to provide for efficient and dynamic support of mobile low latency services.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving, by a user plane entity of an inter mobile device information exchange service, from a control plane entity of said service hosting management functionality for said service, a forwarding rule for forwarding messages related to said service between participants of said service, wherein said user plane entity is located in a connection path between said control plane entity and a first participant of said service and in a connection path between said control plane entity and a second participant of said service, storing said forwarding rule in a rule storage, wherein each of forwarding rules stored in said rule storage is indicative of forwarding messages related to said service from a respective sender participant of said service to a respective receiver participant of said service, receiving a message from said first participant of said service, said message being indicative of said first participant of said service and said service, deciding whether to forward said message to said second participant of said service based on said forwarding rule, and forwarding, upon affirmative result of said deciding, said message to said second participant of said service.

According to an exemplary aspect of the present invention, there is provided a method comprising maintaining, by a control plane entity of an inter mobile device information exchange service hosting management functionality for said service, information on a plurality of participants of said service in a service area, generating a forwarding rule indicative of forwarding messages related to said service from a sender participant of said plurality of participants to a receiver participant of said plurality of participants based on said information on said plurality of participants of said service in said service area, and transmitting said forwarding rule to a user plane entity of said service, wherein said user plane entity is located in a connection path between said control plane entity and said first participant of said service and in a connection path between said control plane entity and said second participant of said service.

According to an exemplary aspect of the present invention, there is provided a method comprising receiving, from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service, and transmitting a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service.

According to an exemplary aspect of the present invention, there is provided an apparatus in a user plane entity of an inter mobile device information exchange service, the apparatus comprising a receiving circuitry configured to receive, from a control plane entity of said service hosting management functionality for said service, a forwarding rule for forwarding messages related to said service between participants of said service, wherein said user plane entity is located in a connection path between said control plane entity and a first participant of said service and in a connection path between said control plane entity and a second participant of said service, a storing circuitry configured to store said forwarding rule in a rule storage, wherein each of forwarding rules stored in said rule storage is indicative of forwarding messages related to said service from a respective sender participant of said service to a respective receiver participant of said service, wherein said receiving circuitry is further configured to receive a message from said first participant of said service, said message being indicative of said first participant of said service and said service, and said apparatus further comprising a deciding circuitry configured to decide whether to forward said message to said second participant of said service based on said forwarding rule, and a forwarding circuitry configured to forward, upon affirmative result of said deciding, said message to said second participant of said service.

According to an exemplary aspect of the present invention, there is provided an apparatus in a control plane entity of an inter mobile device information exchange service hosting management functionality for said service, the apparatus comprising a maintaining circuitry configured to maintain information on a plurality of participants of said service in a service area, a generating circuitry configured to generate a forwarding rule indicative of forwarding messages related to said service from a sender participant of said plurality of participants to a receiver participant of said plurality of participants based on said information on said plurality of participants of said service in said service area, and a transmitting circuitry configured to transmit said forwarding rule to a user plane entity of said service, wherein said user plane entity is located in a connection path between said control plane entity and said first participant of said service and in a connection path between said control plane entity and said second participant of said service.

According to an exemplary aspect of the present invention, there is provided an apparatus comprising a receiving circuitry configured to receive, from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service, and a transmitting circuitry configured to transmit a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service.

According to an exemplary aspect of the present invention, there is provided an apparatus in a control plane entity of an inter mobile device information exchange service hosting management functionality for said service, the apparatus comprising at least one processor, at least one memory including computer program code, and at least one interface configured for communication with at least another apparatus, the at least one processor, with the at least one memory and the computer program code, being configured to cause the apparatus to perform maintaining, by a control plane entity of an inter mobile device information exchange service hosting management functionality for said service, information on a plurality of participants of said service in a service area, generating a forwarding rule indicative of forwarding messages related to said service from a sender participant of said plurality of participants to a receiver participant of said plurality of participants based on said information on said plurality of participants of said service in said service area, and transmitting said forwarding rule to a user plane entity of said service, wherein said user plane entity is located in a connection path between said control plane entity and said first participant of said service and in a connection path between said control plane entity and said second participant of said service.

According to an exemplary aspect of the present invention, there is provided an apparatus in a control plane entity of an inter mobile device information exchange service hosting management functionality for said service, the apparatus comprising at least one processor, at least one memory including computer program code, and at least one interface configured for communication with at least another apparatus, the at least one processor, with the at least one memory and the computer program code, being configured to cause the apparatus to perform receiving, from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service, and transmitting a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

In particular, according to an exemplary aspect of the present invention, there is provided a non-transitory computer-readable medium storing instructions that, when executed by a processing device, perform at least one of a first method, a second method, and a third method, wherein the first method comprises receiving, from a control plane entity of said service hosting management functionality for said service, a forwarding rule for forwarding messages related to said service between participants of said service, wherein said user plane entity is located in a connection path between said control plane entity and a first participant of said service and in a connection path between said control plane entity and a second participant of said service, storing said forwarding rule in a rule storage, wherein each of forwarding rules stored in said rule storage is indicative of forwarding messages related to said service from a respective sender participant of said service to a respective receiver participant of said service, receiving a message from said first participant of said service, said message being indicative of said first participant of said service and said service, deciding whether to forward said message to said second participant of said service based on said forwarding rule, and forwarding, upon affirmative result of said deciding, said message to said second participant of said service, and wherein the second method comprises maintaining, by a control plane entity of an inter mobile device information exchange service hosting management functionality for said service, information on a plurality of participants of said service in a service area, generating a forwarding rule indicative of forwarding messages related to said service from a sender participant of said plurality of participants to a receiver participant of said plurality of participants based on said information on said plurality of participants of said service in said service area, and transmitting said forwarding rule to a user plane entity of said service, wherein said user plane entity is located in a connection path between said control plane entity and said first participant of said service and in a connection path between said control plane entity and said second participant of said service, and wherein the third method comprises receiving, from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service, and transmitting a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service.

According to an exemplary/example aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient handling of mobile low latency service scenarios to thereby solve at least part of the problems and drawbacks identified in relation to the prior art.

By way of exemplary embodiments of the present invention, there is provided efficient and dynamic support of mobile low latency services. More specifically, by way of exemplary embodiments of the present invention, there are provided measures and mechanisms for realizing efficient and dynamic support of mobile low latency services (in particular in relation to V2X communication).

Thus, improvement is achieved by methods, apparatuses and computer program products enabling/realizing efficient and dynamic support of mobile low latency services.

BRIEF DESCRIPTION OF THE DRAWINGS

In the following, the present invention will be described in greater detail by way of non-limiting examples with reference to the accompanying drawings, in which FIG. 18 is a block diagram alternatively illustrating apparatuses according to exemplary embodiments of the present invention.

DETAILED DESCRIPTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, V2X communication is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) efficient and dynamic support of mobile low latency services (in particular in relation to V2X communication).

In view of the drawbacks of the prior art, the present invention is based on the idea that it would be beneficial to provide mechanisms to keep the traffic in the network instead of forwarding the traffic to the server application. In so doing, for example, forwarding traffic and CPU resources are saved.

Figure 1:
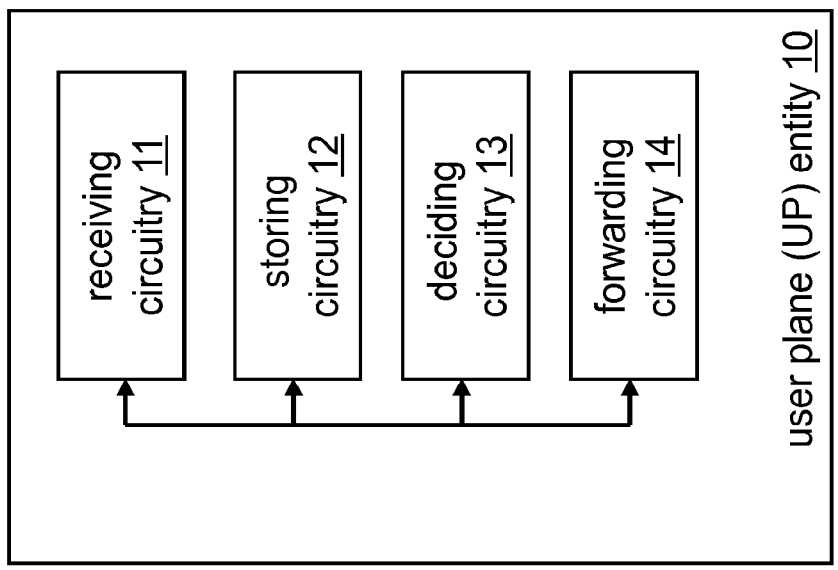
FIG. 1 is a block diagram illustrating an apparatus according to exemplary embodiments of the present invention.
Figure 6:
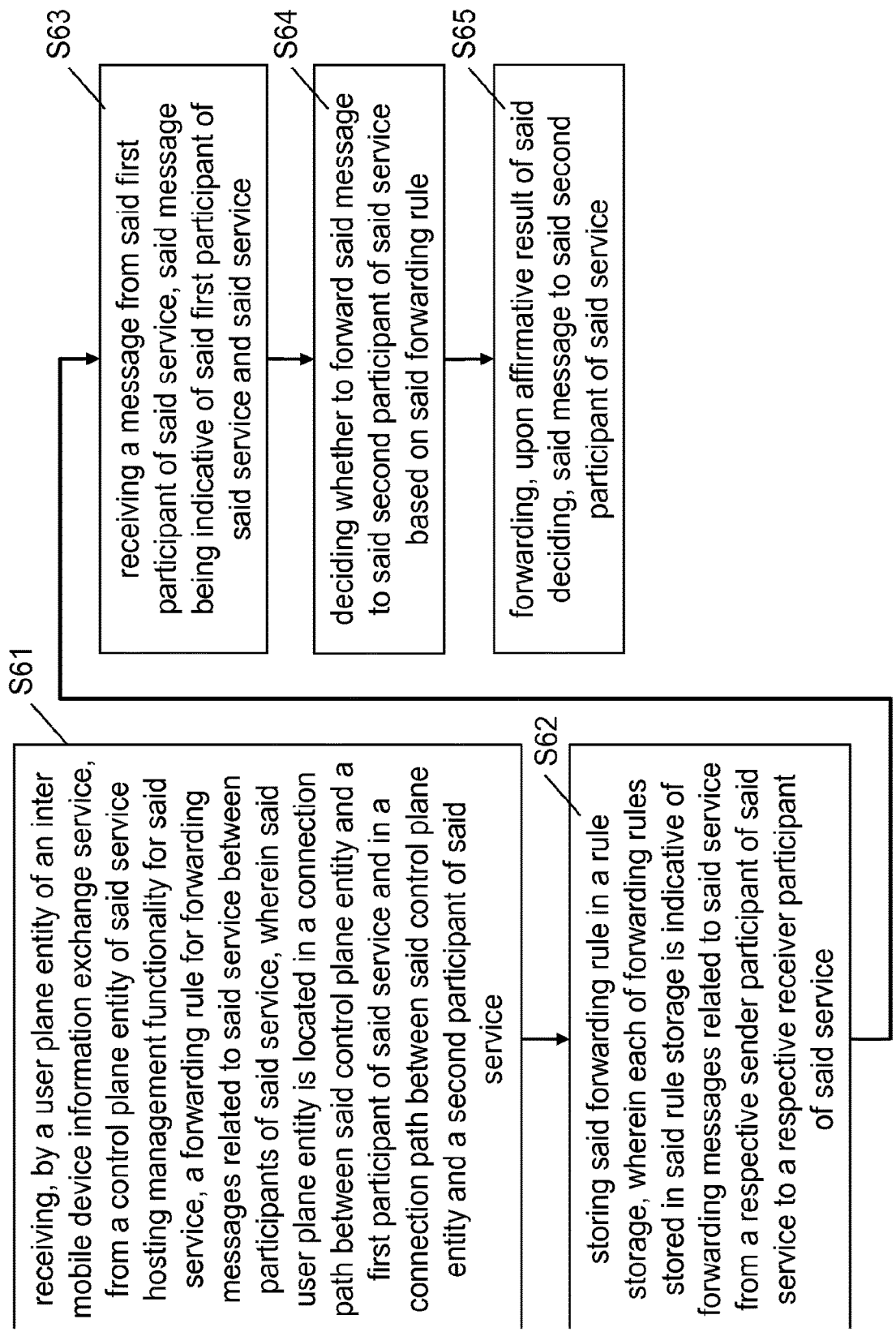
FIG. 6 is a schematic diagram of a procedure according to exemplary embodiments of the present invention.

FIG. 1 is a block diagram illustrating an apparatus according to exemplary embodiments of the present invention. The apparatus may be a user plane entity 10 comprising a receiving circuitry 11, a storing circuitry 12, a deciding circuitry 13, and a forwarding circuitry 14. The receiving circuitry 11 receives, from a control plane entity of said service hosting management functionality for said service, a forwarding rule for forwarding messages related to said service between participants of said service, wherein said user plane entity is located in a connection path between said control plane entity and a first participant of said service and in a connection path between said control plane entity and a second participant of said service. The storing circuitry 12 stores said forwarding rule in a rule storage, wherein each of forwarding rules stored in said rule storage is indicative of forwarding messages related to said service from a respective sender participant of said service to a respective receiver participant of said service. The receiving circuitry 11 further receives a message from said first participant of said service, said message being indicative of said first participant of said service and said service. The deciding circuitry 13 decides whether to forward said message to said second participant of said service based on said forwarding rule. The forwarding circuitry 14 forwards, upon affirmative result of said deciding, said message to said second participant of said service. FIG. 6 is a schematic diagram of a procedure according to exemplary embodiments of the present invention. The apparatus according to FIG. 1 may perform the method of FIG. 6 but is not limited to this method. The method of FIG. 6 may be performed by the apparatus of FIG. 1 but is not limited to being performed by this apparatus.

As shown in FIG. 6, a procedure according to exemplary embodiments of the present invention comprises an operation of receiving (S61), by a user plane entity of an inter mobile device information exchange service, from a control plane entity of said service hosting management functionality for said service, a forwarding rule for forwarding messages related to said service between participants of said service, wherein said user plane entity is located in a connection path between said control plane entity and a first participant of said service and in a connection path between said control plane entity and a second participant of said service, an operation of storing (S62) said forwarding rule in a rule storage, wherein each of forwarding rules stored in said rule storage is indicative of forwarding messages related to said service from a respective sender participant of said service to a respective receiver participant of said service, an operation of receiving (S63) a message from said first participant of said service, said message being indicative of said first participant of said service and said service, an operation of deciding (S64) whether to forward said message to said second participant of said service based on said forwarding rule, and an operation of forwarding (S65), upon affirmative result of said deciding, said message to said second participant of said service.

Figure 2:
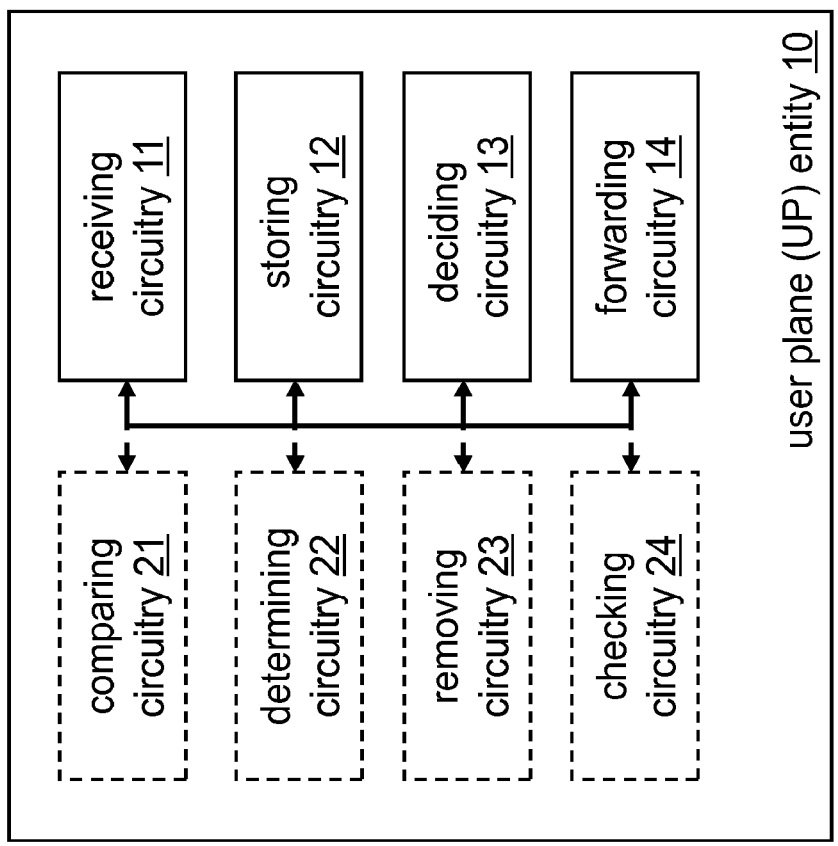
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise comparing circuitry 21, determining circuitry 22, removing circuitry 23, and checking circuitry 24.

In an embodiment at least some of the functionalities of the apparatus shown in FIG. 1 (or 2) may be shared between two (or more) physically separate devices forming one operational entity. Therefore, the apparatus may be seen to depict the operational entity comprising one or more physically separate devices for executing at least some of the described processes.

In this regard, it is noted that sender participant of a service in relation to a forwarded message (according to a forwarding rule) means a sender of the respective message. In addition, receiver participant of a service in relation to a forwarded message (according to a forwarding rule) means a recipient of the respective message. That is, each participant of a service may be a sender participant (i.e. a potential sender of a message) in a certain forwarding rule and may in addition be a receiver participant (i.e. a potential recipient of a message) in another certain forwarding rule.

That is, if a forwarding rule "I" defines that a message in relation to a specific service "X" from device "A" (identified e.g. by an IP address of device "A") is to be forwarded to device "B" (identified e.g. by an IP address of device "B"), then device "A" is a sender participant, while device "B" is a receiver participant (with respect to the forwarding rule "I"). Further, if a forwarding rule "II" defines that a message in relation to the specific service "X" from device "B" is to be forwarded to device "A", then device "B" is a sender participant, while device "A" is a receiver participant (with respect to the forwarding rule "II").

According to a variation of the procedure shown in FIG. 6 according to exemplary embodiments of the present invention, each of said forwarding rules stored in said rule storage comprises a service identifier indicative of a belonging to said service.

According to a variation of the procedure shown in FIG. 6, exemplary details of the deciding operation (S64) are given, which are inherently independent from each other as such.

Such exemplary deciding operation (S64) according to exemplary embodiments of the present invention may comprise an operation of comparing said message with said forwarding rules stored in said rule storage.

Such exemplary deciding operation (S64) according to exemplary embodiments of the present invention may further comprise an operation of determining to forward said message to said second participant of said service, if, as a result of said comparing, any of said forwarding rules stored in said rule storage matches with said message with respect to said service identifier and is indicative of said first participant as said sender participant and said second participant as said receiver participant, and/or an operation of determining to forward said message to said control plane entity, if, as a result of said comparing, any of said forwarding rules stored in said rule storage matches with said message with respect to said service identifier and is not indicative of said first participant as said sender participant and none of said forwarding rules stored in said rule storage forwarding rule matches with said message with respect to said service identifier and is indicative of said first participant as said sender participant and said second participant as said receiver participant.

According to a variation of the procedure shown in FIG. 6, exemplary additional operations are given, which are inherently independent from each other as such. According to such variation, an exemplary method according to exemplary embodiments of the present invention may comprise an operation of receiving, from said control plane entity, a forwarding rule removal instruction identifying at least one participant of said service to be removed, and an operation of removing, from said rule storage, forwarding rules related to said at least one participant to be removed.

According to a variation of the procedure shown in FIG. 6, exemplary details of the deciding operation (S64) are given, which are inherently independent from each other as such.

Such exemplary deciding operation (S64) according to exemplary embodiments of the present invention may comprise an operation of checking whether said received message is a duplicate of any of a predetermined number of previously received messages, and an operation of determining not to forward said message to said second participant of said service, if, as a result of said checking, said message is identified as said duplicate.

According to a further variation of the procedure shown in FIG. 6 according to exemplary embodiments of the present invention, each of said sender participant and said receiver participant is identified by at least one of an internet protocol address and a media access control address.

According to a further variation of the procedure shown in FIG. 6, exemplary additional operations are given, which are inherently independent from each other as such. According to such variation, an exemplary method according to exemplary embodiments of the present invention may comprise an operation of transmitting at least a fraction of a plurality of received messages related to said service to said control plane entity.

According to a still further variation of the procedure shown in FIG. 6 according to exemplary embodiments of the present invention, said inter mobile device information exchange service is one of a vehicle-to-X-communications service, a broadband access in a crowd service, and a service related to mobile gaming applications.

According to a still further variation of the procedure shown in FIG. 6 according to exemplary embodiments of the present invention, said message is at least one of a collaborative/cooperative awareness message and a decentralized environmental notification message.

According to a still further variation of the procedure shown in FIG. 6 according to exemplary embodiments of the present invention, said mobile device information exchange service is indicated by a specific port, preferably by a basic transport protocol port.

According to a still further variation of the procedure shown in FIG. 6 according to exemplary embodiments of the present invention, said forwarding rule is transported via one of an OpenFlow FlowMod message, an International Telegraph Union Telecommunication Standardization Sector (ITU-T) gateway control protocol H.248, a control and user plane separation (CUPS) Sx interface, a policy and charging rules function (PCRF) Rx interface, a PCRF Gx interface, and a mobile edge computing (MEC) Mp2 reference point.

According to a still further variation of the procedure shown in FIG. 6 according to exemplary embodiments of the present invention, any of said respective sender participant of said service and said respective receiver participant of said service is indicated in said service forwarding rules stored in said rule storage by means of a wildcard. In this regard, a wildcard (e.g. "*") addresses for example all known participants of said service or a group of all known participants of said service.

According to a still further variation of the procedure shown in FIG. 6 according to exemplary embodiments of the present invention, said message further includes at least one of information regarding a service area served by a serving station related to said service, a station identifier of said serving station, and a service identifier indicative of a belonging of said message to said service.

Figure 3:
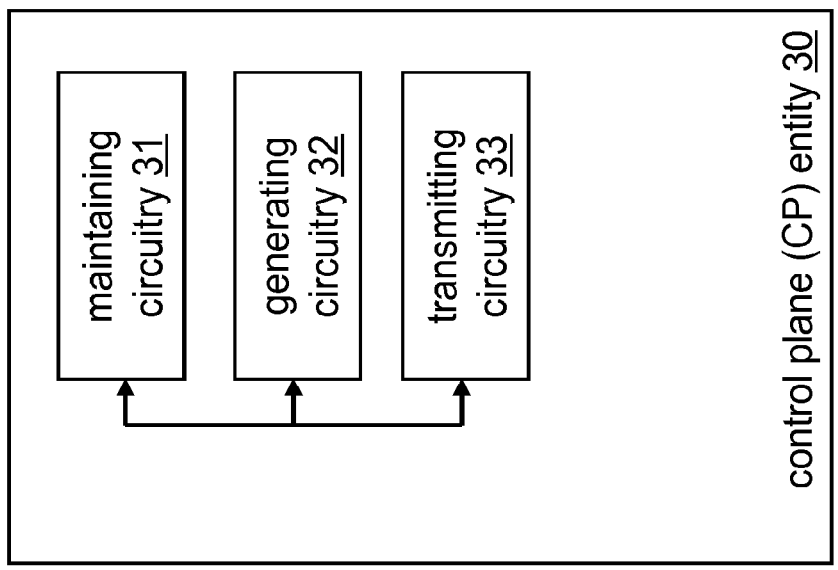
FIG. 3 is a block diagram illustrating an apparatus according to exemplary embodiments of the present invention.
Figure 7:
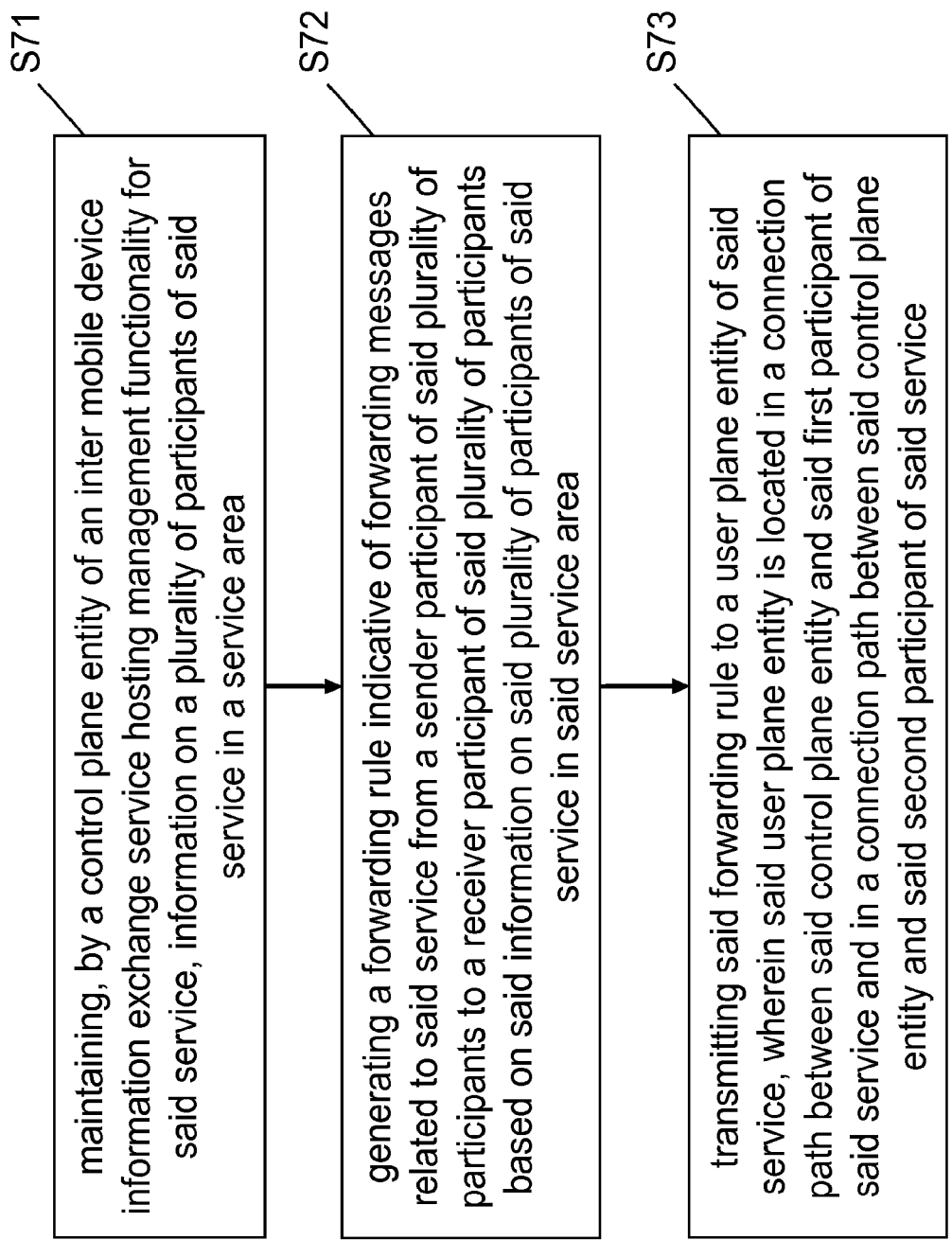
FIG. 7 is a schematic diagram of a procedure according to exemplary embodiments of the present invention.

FIG. 3 is a block diagram illustrating an apparatus according to exemplary embodiments of the present invention. The apparatus may be a control plane entity 30 comprising a maintaining circuitry 31, a generating circuitry 32, and a transmitting circuitry 33. The maintaining circuitry 31 maintains information on a plurality of participants of said service in a service area. The generating circuitry 32 generates a forwarding rule indicative of forwarding messages related to said service from a sender participant of said plurality of participants to a receiver participant of said plurality of participants based on said information on said plurality of participants of said service in said service area. The transmitting circuitry 33 transmits said forwarding rule to a user plane entity of said service, wherein said user plane entity is located in a connection path between said control plane entity and said first participant of said service and in a connection path between said control plane entity and said second participant of said service. FIG. 7 is a schematic diagram of a procedure according to exemplary embodiments of the present invention. The apparatus according to FIG. 3 may perform the method of FIG. 7 but is not limited to this method. The method of FIG. 7 may be performed by the apparatus of FIG. 3 but is not limited to being performed by this apparatus.

As shown in FIG. 7, a procedure according to exemplary embodiments of the present invention comprises an operation of maintaining (S71), by a control plane entity of an inter mobile device information exchange service hosting management functionality for said service, information on a plurality of participants of said service in a service area, an operation of generating (S72) a forwarding rule indicative of forwarding messages related to said service from a sender participant of said plurality of participants to a receiver participant of said plurality of participants based on said information on said plurality of participants of said service in said service area, and an operation of transmitting (S73) said forwarding rule to a user plane entity of said service, wherein said user plane entity is located in a connection path between said control plane entity and said first participant of said service and in a connection path between said control plane entity and said second participant of said service.

Figure 4:
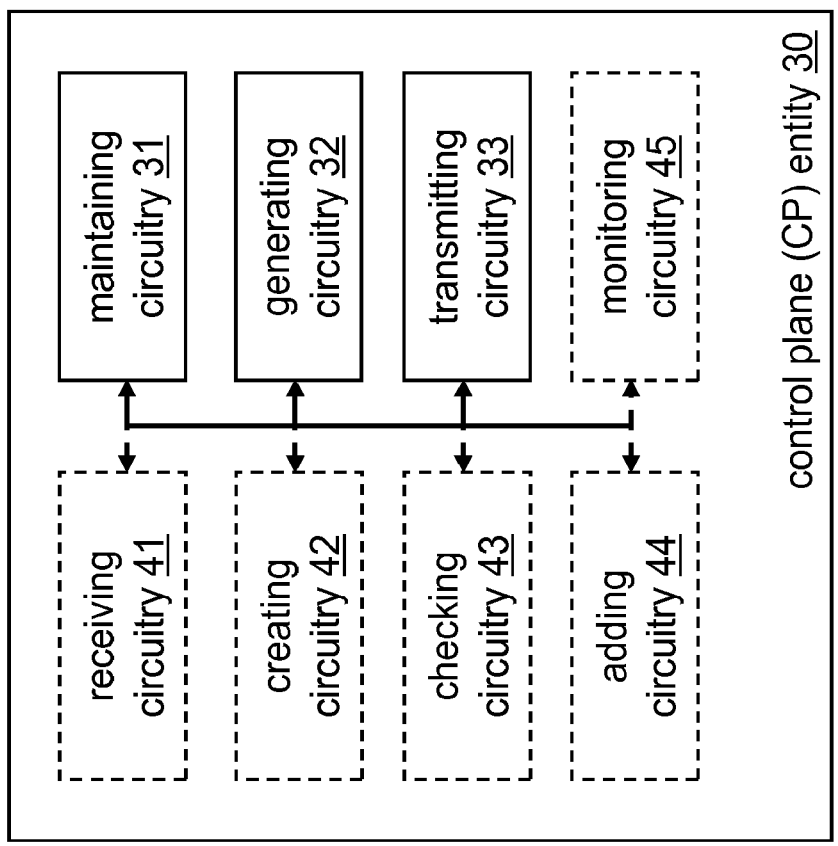
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise receiving circuitry 41, creating circuitry 42, checking circuitry 43, adding circuitry 44, and monitoring circuitry 45.

In an embodiment at least some of the functionalities of the apparatus shown in FIG. 3 (or 4) may be shared between two (or more) physically separate devices forming one operational entity. Therefore, the apparatus may be seen to depict the operational entity comprising one or more physically separate devices for executing at least some of the described processes.

According to a variation of the procedure shown in FIG. 7, exemplary additional operations are given, which are inherently independent from each other as such. According to such variation, an exemplary method according to exemplary embodiments of the present invention may comprise an operation of receiving a registration message for registration of a new participant to said service or a deregistration message for deregistration of a present participant from said service.

According to a variation of the procedure shown in FIG. 7, exemplary details of the generating operation (S72) and exemplary additional operations are given, which are inherently independent from each other as such.

Namely, in case of said registration message being received, such exemplary generating operation (S72) according to exemplary embodiments of the present invention may comprise an operation of creating at least one forwarding rule indicative of forwarding messages related to said service based on said new participant as said sender participant, and at least one forwarding rule indicative of forwarding messages related to said service based on said new participant as said receiver participant.

Preferably, for the case of the new participant as the sender participant, a forwarding rule is created for this sender participant that all messages sent by the sender participant are to be multiplied to all other old/second (already present) participants, more preferably by the PGW-U where the sender participant is connected to. Preferably as an alternative, for that case, one forwarding rule per other old/receiver participant is created for this sender participant that all messages sent by the sender participant are multiplied to the respective one of the other old/receiver (already present) participants.

Furthermore, preferably, for the case of the new participant as the receiver participant, a rule is created for each old/sender (already present) participant that any message sent by any of the respective old/sender participant is also to be duplicated to the new/receiver participant, more preferably at the PGW-U to which the old/sender (already present) participant is connected to.

Accordingly, preferably, according to exemplary embodiments of the present invention forwarding rules are created for the messages being sent by the new participant, and rules for the messages being sent by old (already present) participants.

Further, in case of said deregistration message being received, an exemplary method according to exemplary embodiments of the present invention may further comprise an operation of transmitting, to said user plane entity, a forwarding rule removal instruction identifying at least said present participant and being indicative of an instruction to remove forwarding rules related to said present participant.

Preferably, the forwarding rule removal instruction is indicative of an instruction to remove all forwarding rules related to the present participant, that is, an instruction to remove the rules for the participant which is leaving and also rules for the old/staying participants (in relation to the leaving participant) since it is not needed anymore to multiply the messages to the leaving participant/participant which left the area.

According to a variation of the procedure shown in FIG. 7, exemplary additional operations are given, which are inherently independent from each other as such. According to such variation, an exemplary method according to exemplary embodiments of the present invention may comprise an operation of receiving, from said user plane entity, a message related to said service indicative of an origin of said message, and an operation of checking whether said origin of said message corresponds to an entry in said information on said plurality of participants of said service in said served area.

If, as a result of said checking, said origin of said message does not correspond to an entry in said information on said plurality of participants of said service in said served area, according to a variation of the procedure shown in FIG. 7, exemplary details of the generating operation (S72) and exemplary additional operations are given, which are inherently independent from each other as such.

Namely, according to such variation, an exemplary method according to exemplary embodiments of the present invention may comprise an operation of adding a new entry corresponding to said origin of said message to said information on said plurality of participants of said service in said served area, and such exemplary generating operation (S72) according to exemplary embodiments of the present invention may comprise an operation of creating at least one forwarding rule indicative of forwarding messages related to said service based on said new entry as said sender participant, and at least one forwarding rule indicative of forwarding messages related to said service based on said new entry as said receiver participant.

In this regard, it is noted that an origin of a message means the original sender of a message, i.e., a network element (participant) which issues the respective message.

According to a further variation of the procedure shown in FIG. 7, exemplary additional operations are given, which are inherently independent from each other as such. According to such variation, an exemplary method according to exemplary embodiments of the present invention may comprise an operation of monitoring, for each entry in said information on said plurality of participants of said service in said served area, a time elapsed from the last received message related to said service originated from said entry.

In case said time exceeds a predetermined period, an exemplary method according to exemplary embodiments of the present invention may further comprise an operation of transmitting, to said user plane entity, a forwarding rule removal instruction identifying at least said entry and being indicative of an instruction to remove forwarding rules related to said entry.

Figure 5:
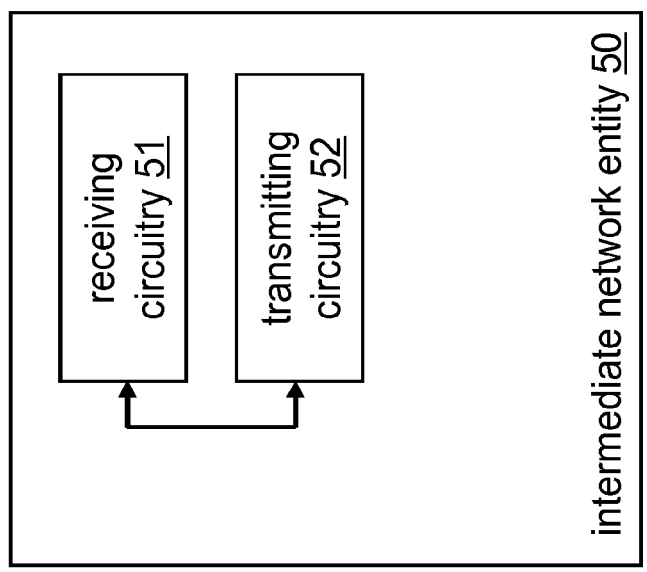
FIG. 5 is a block diagram illustrating an apparatus according to exemplary embodiments of the present invention.

FIG. 5 is a block diagram illustrating an apparatus according to exemplary embodiments of the present invention. The apparatus may be an intermediate network entity (intermediate node) 50 which may for example be arranged between a user plane entity and a control plane entity. According to exemplary embodiments of the present invention, a plurality of such intermediate network entities 50 may be arranged between a user plane entity and a control plane entity. The apparatus according to FIG. 5 comprises a receiving circuitry 51 and a transmitting circuitry 52. The receiving circuitry 51 receives, from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service. The transmitting circuitry 52 transmits a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service.

Figure 8:
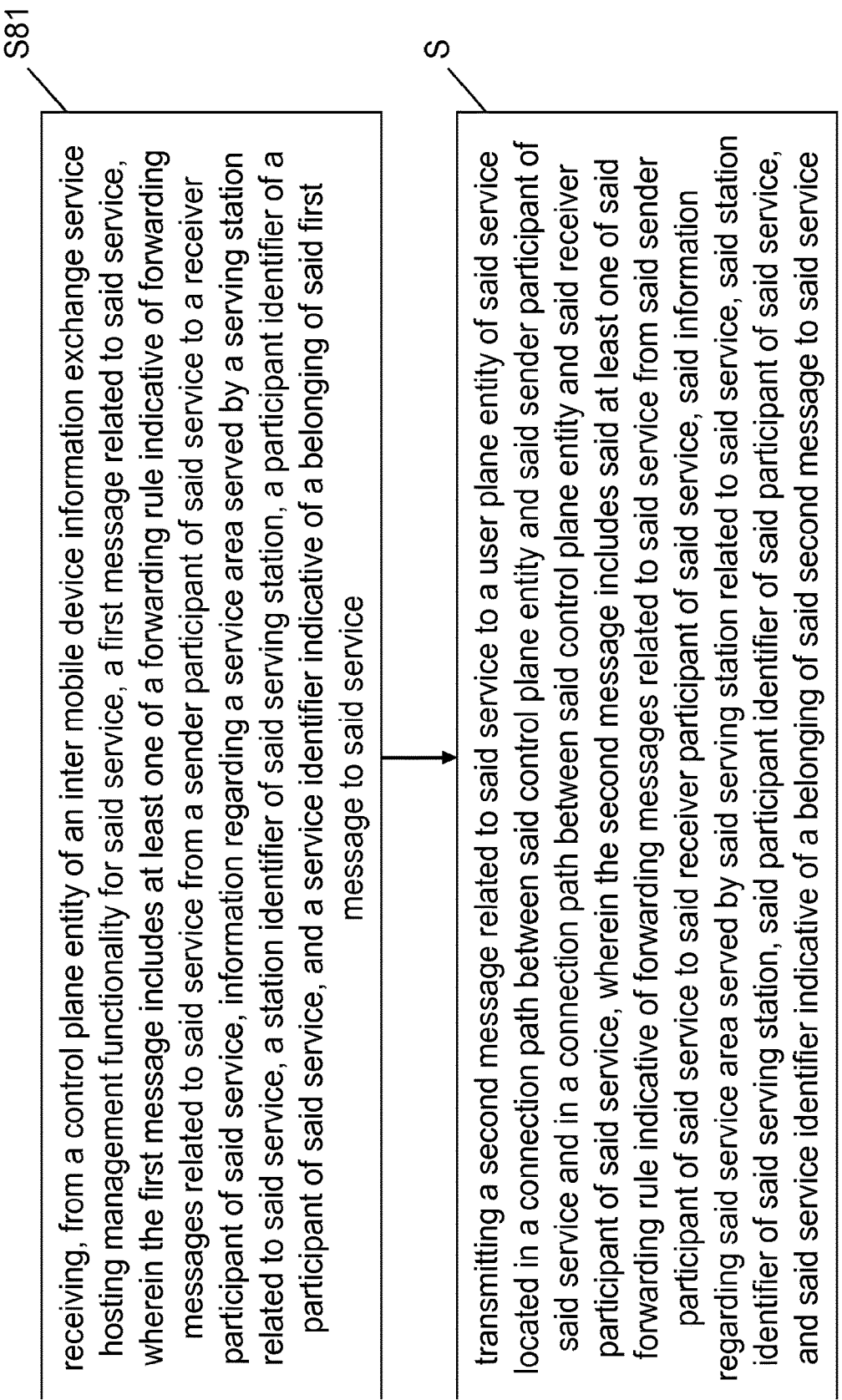
FIG. 8 is a schematic diagram of a procedure according to exemplary embodiments of the present invention.
Figure 9:
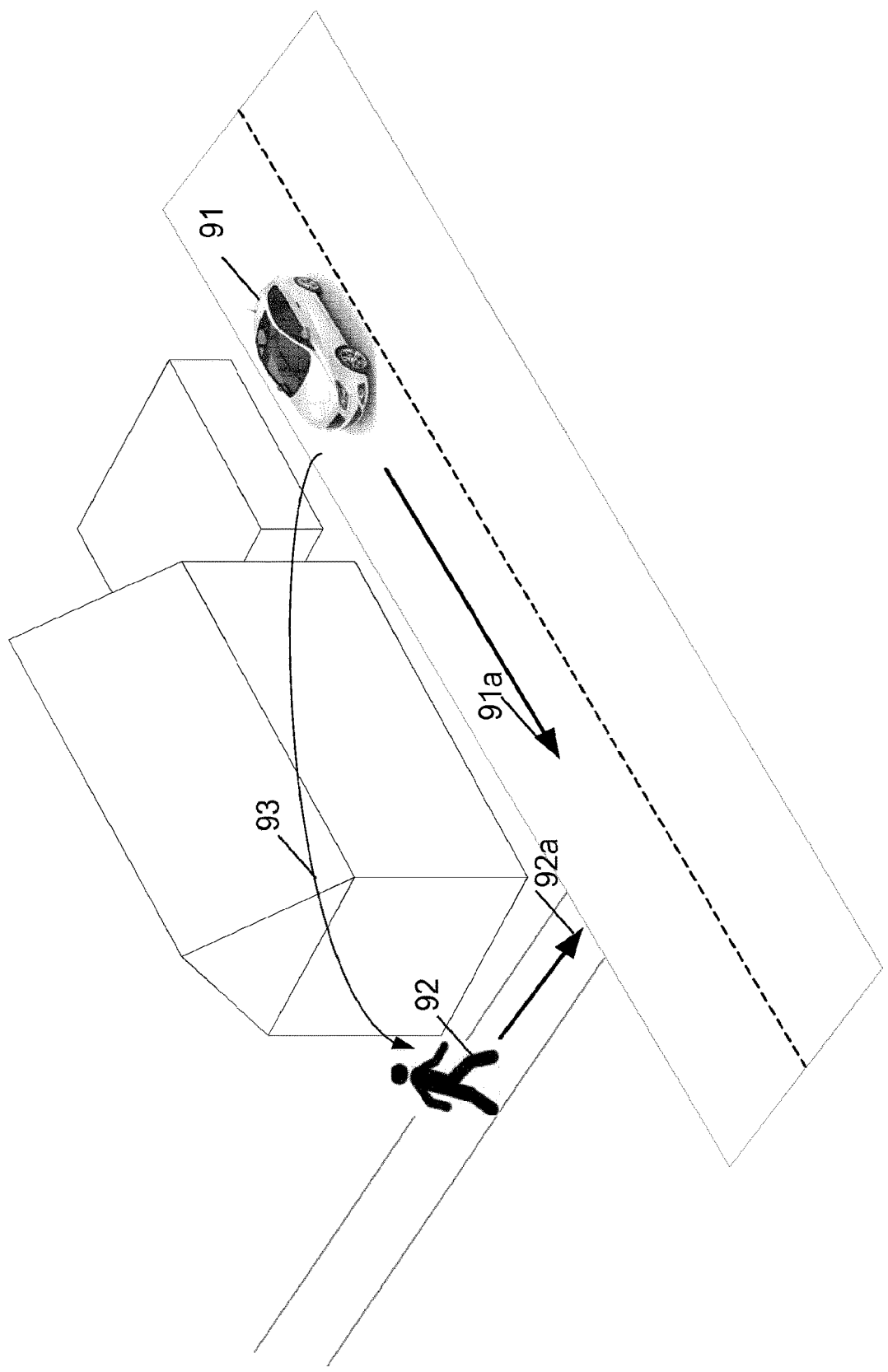
FIG. 9 shows a schematic diagram illustrating an exemplary scenario in which a vehicle and a pedestrian are heading for a collision.
Figure 10:
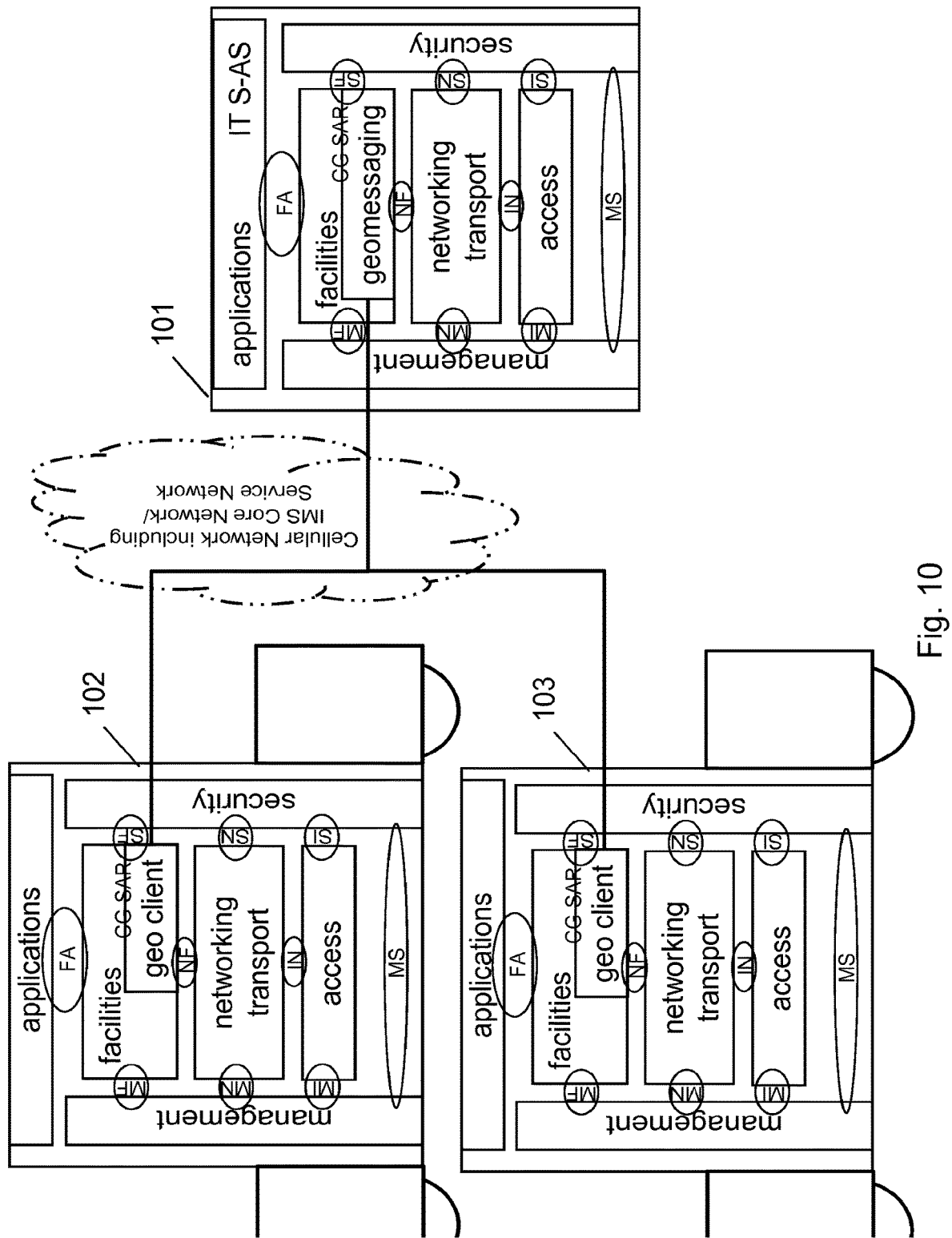
FIG. 10 shows a schematic diagram illustrating an exemplary scenario including two vehicles and a cooperative intelligent transport system.
Figure 11:
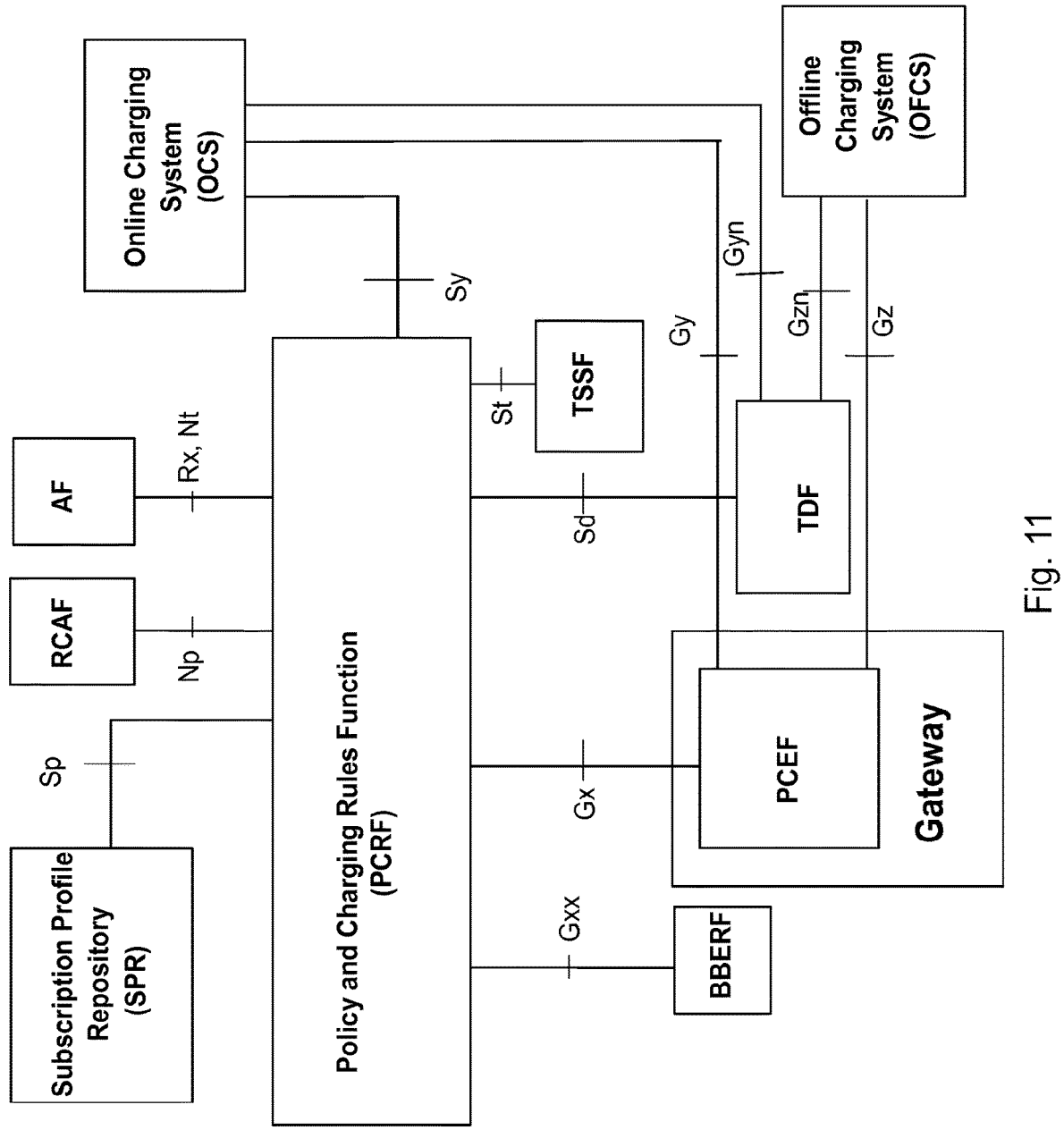
FIG. 11 shows a schematic diagram illustrating an exemplary policy and charging control logical architecture.

The apparatus according to FIG. 5 may perform the method of FIG. 8 but is not limited to this method. The method of FIG. 8 may be performed by the apparatus of FIG. 5 but is not limited to being performed by this apparatus.

As shown in FIG. 8, a procedure according to exemplary embodiments of the present invention comprises an operation of receiving (S81), from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service, and an operation of transmitting (S82) a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service.

In an embodiment at least some of the functionalities of the apparatus shown in FIG. 5 may be shared between two (or more) physically separate devices forming one operational entity. Therefore, the apparatus may be seen to depict the operational entity comprising one or more physically separate devices for executing at least some of the described processes.

In more concrete terms with respect to the apparatus shown in FIG. 5, in particular in relation to V2X as the service, the first and second messages may include the V2X server area as said information regarding an area served by a serving station related to said service, a station ID as said station identifier of said serving station, an IP address of the participant as said participant identifier, and/or a CAM/DENM-identifier as said service identifier.

These information elements may be transferred explicitly via new parameters or by a transparent container between the user plane and the control plane and vice versa.

The apparatus shown in FIG. 5 may thus be embodied by a PCRF and/or MEC, while the first and second messages may be received and/or transmitted via (PCRF) Rx and/or Gx interfaces (see e.g. FIG. 16), via (MEC) Mp2 interfaces (see e.g. FIG. 17), and/or OpenFlow interfaces.

It is however noted that the present invention is not limited to this concrete example.

In more specific terms, according to exemplary embodiments of the present invention, the V2X application (currently placed as integrated control and user plane function on top of MEC/RACS) is separated into control plane and user plane.

In particular, according to exemplary embodiments of the present invention, the control plane is placed onto servers in a more central data center, whereas the user plane is hosted on the user plane of the PGW (either integrated or separated) such that the control plane V2X server application instructs the V2X user plane to evaluate the CAM/DENMs (messages).

As an example, according to exemplary embodiments of the present invention, the control plane part of the V2X server application instructs the user plane of e.g. the PGW via software-defined networking (SDN) means to identify e.g. the CAM and to forward the CAM to the other V2X participants (instead of simply forwarding all payload to the V2X server application).

Figure 14:
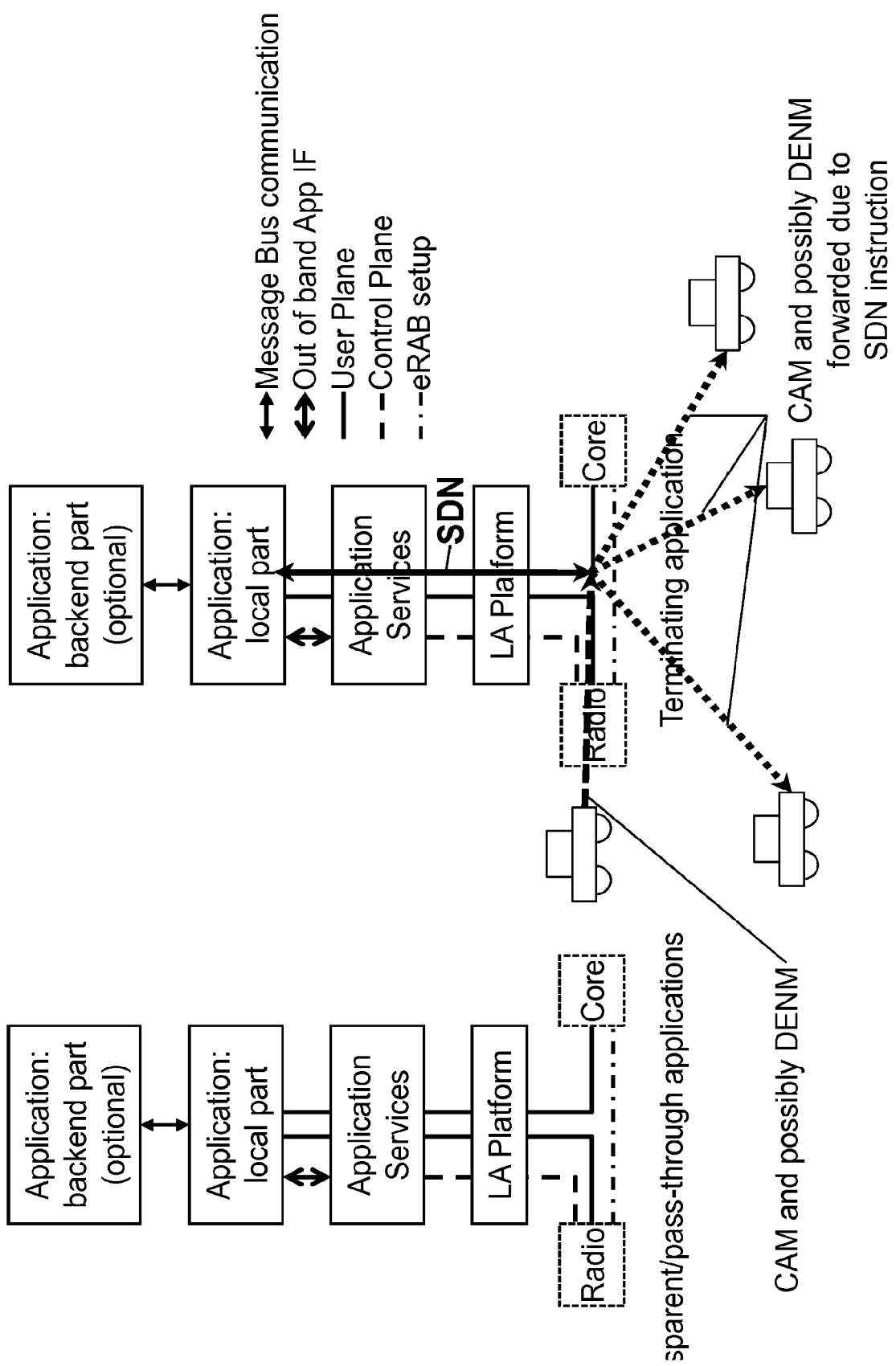
FIG. 14 shows a schematic diagram illustrating exemplary scenarios with applications hosted according to exemplary embodiments of the present invention.

FIG. 14 shows a schematic diagram illustrating exemplary scenarios with applications hosted according to exemplary embodiments of the present invention.

In particular, FIG. 14 illustrates a split of the V2X application into a control plane (C-plane, CP) and a user plane (U-plane, UP) according to exemplary embodiments of the present invention.

According thereto, the CAMs are kept on the network level for distributing them to the surrounding cars instead of sending them always to the server application and back and only subsequently to the surrounding cars. In so doing, according to exemplary embodiments of the present invention, the MEC platform is enhanced with software-defined networking (SDN) capabilities.

In so doing, no extra processing time is necessary in the application layer in the cloud/data center MEC/RACS. This saves precious computation time which can be spent on the possibility to place the CP of the V2X server application more away from the eNB further to a more centralized smart data center. Accordingly, for instance less software processing time is needed, which allows for more distant data centers which are much cheaper because of the economy of scale effect.

That is, because without implementation the present invention all the CAMs and DENMs would have to be sent up to the V2X server application and down again before the other cars are informed, bandwidth and time going up and down the protocol stacks and physical forwarding equipment would be consumed.

Figure 15:
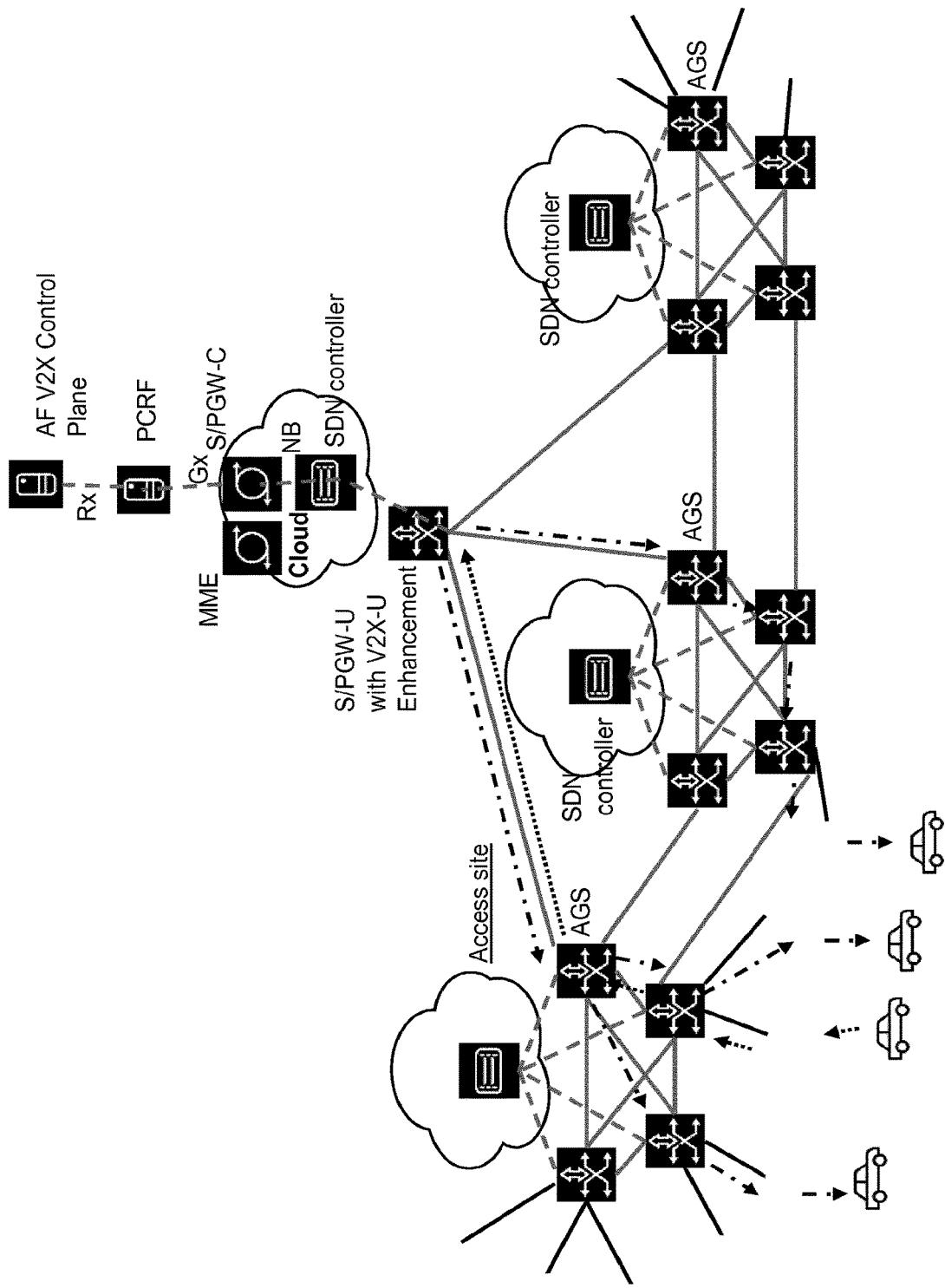
FIG. 15 shows a schematic diagram illustrating exemplary V2V scenarios according to exemplary embodiments of the present invention.

FIG. 15 shows a schematic diagram illustrating exemplary V2V scenarios according to exemplary embodiments of the present invention, and in particular shows coordinated maneuvers with V2X connectivity.

According to FIG. 15, the cars are connected to different RANs and may be handovered. The cars as illustrated in FIG. 15 are frequently sending CAMs and DENMs.

As illustrated in FIG. 15, each car entering a certain new area (service area, e.g. regarding V2X service), the car registers with the V2X server application, and after successful registration it starts sending CAMs and DENMs as appropriate.

Since, according to exemplary embodiments of the present invention, the V2X application control plane (control plane entity) knows each registered car, the V2X application control plane instructs the user plane preferably placed at the PGW-U (but not limited to that) of the 4G architecture or at the corresponding GW-U of the 5G architecture to come (preferably outside the cloud in which the V2X control plane resides), to match any packet received from of any of the registered cars by at least evaluating source IP address and port and the ports for CAM and DENM messages as specified in the specification ETSI EN 302 636-5-1 and as mentioned above.

If there is a match, according to exemplary embodiments of the present invention, the (matching) packet (i.e. message) is forwarded (as instructed by the V2X control plane application via SDN) at least to all the IP addresses (corresponding to the cars in question) signaled down from the control plane to the user plane in order to efficiently forward the CAMs and DENMs (CAM and DENM messages) directly to the cars in question.

According to exemplary embodiments of the present invention, some or all of the CAM/DENM messages may be forwarded to the control plane of the V2X application in addition in order to allow the V2X application to be updated about the circumstances of the traffic as viewed by the cars. In that way, the V2X server application is still enabled to evaluate and act on the information of the vehicles for further consideration. In so doing, on the one hand, the CAMs and DENMs are efficiently forwarded very fast and directly to the participating cars, while the V2X may be additionally informed.

Accordingly, as is also derivable from the arrows depicted in FIG. 15, CAMs and DENMs are sent by one of the cars towards the application (dotted arrows), but redirected by the V2X user plane as instructed by the V2X control plane application to the participating cars (dotted-and-dashed arrows). Corresponding messages sent to the control application are not shown in FIG. 15 but not excluded according to the present invention but also advantageous, as explained above.

If a new car (new participant) is entering the responsibility for the V2X control plane application (i.e. responsibility area, serving area), according to exemplary embodiments of the present invention, an OpenFlow message "Add Flow Mod" is modified such that the layout of the BTP header can be matched with the receiving packet and is efficiently duplicated and sent very fast to the all the V2X applications on the cars in the vicinity (other participants in area) for quick processing.

If a particular car (present participant) leaves the area, according to exemplary embodiments of the present invention, the V2X control plane application instructs the user plane application to remove the corresponding address from the list of participants to which the DENMs and CAMs are to be duplicated to.

According to further exemplary embodiments of the present invention, only a fraction of the DENMs and CAMs (uplink messages) from each car is forwarded to the participating neighbor cars. In order to be able to identify duplicates for each originating message, the user plane (entity) is instructed by the control plane (entity) to check whether a duplicate is received, before forwarding it on the neighbor cars. For instance, the user plane may perform a hashing algorithm on the content of the received packet (message) and store the hash result. On receipt of the next e.g. ten (not limited to this number) packets (e.g. a counter is set to ten), the user plane again performs for each received packet the same hashing algorithm and compares it with the last stored hash result. If the results do not differ the received packet is not forwarded, and the counter (which e.g. started with ten) is decreased. However, if the results differ, the new packet (message) is identified as not being a duplicate and the new result is stored and the counter is set to ten and the message is forwarded.

That is, exemplary embodiments of the present invention are based on the idea that in general the MEC (or corresponding) application may not want to be bothered with all the traffic. Accordingly, as already mentioned, according to the present invention, each possible MEC application (not only the V2X application) may potentially be able to instruct via the SDN interface which kind of traffic it is interested in.

In that sense the V2X application mentioned is just one example, although the V2X application may still be interested to receive same portion a particular traffic. In particular, the V2X application may still want to be informed about the CAMs/DENMs of the participating cars for decision logic. For instance the V2X server application may still be interested in receiving the CAMs in order to be able to detect where a collision may happen or has happened in order to, for example, alert rescue teams about the location of the accident, while still allowing the CAM to be distributed instantaneously within the network to the participating cars without delaying them due the processing on the V2X application layer before forwarding them to the cars.

Figure 12:
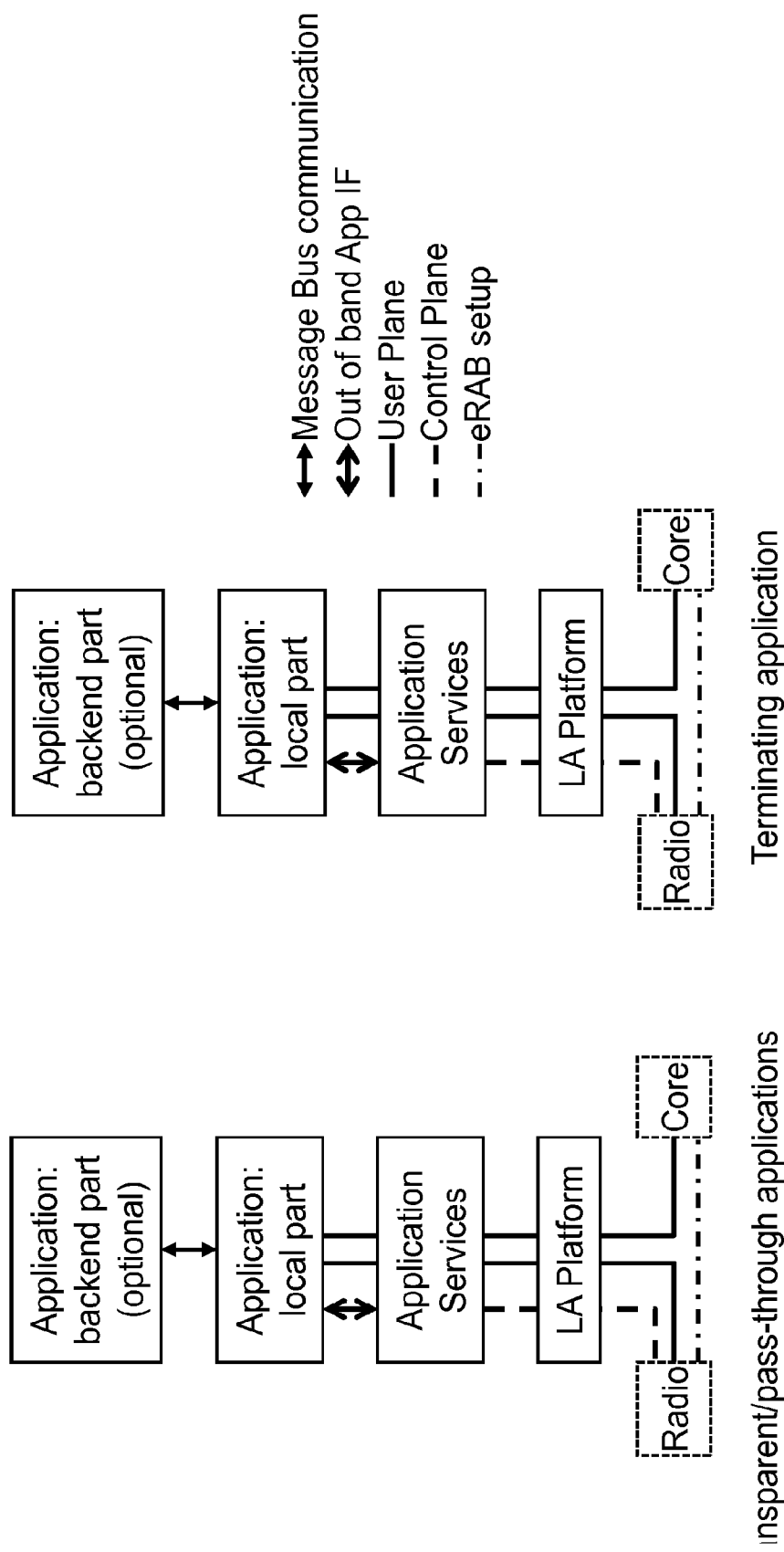
FIG. 12 shows a schematic diagram illustrating exemplary scenarios of applications hosted on an eNB or near to, FIG. 13 shows a schematic diagram illustrating an exemplary proximity services scenario.
Figure 13:
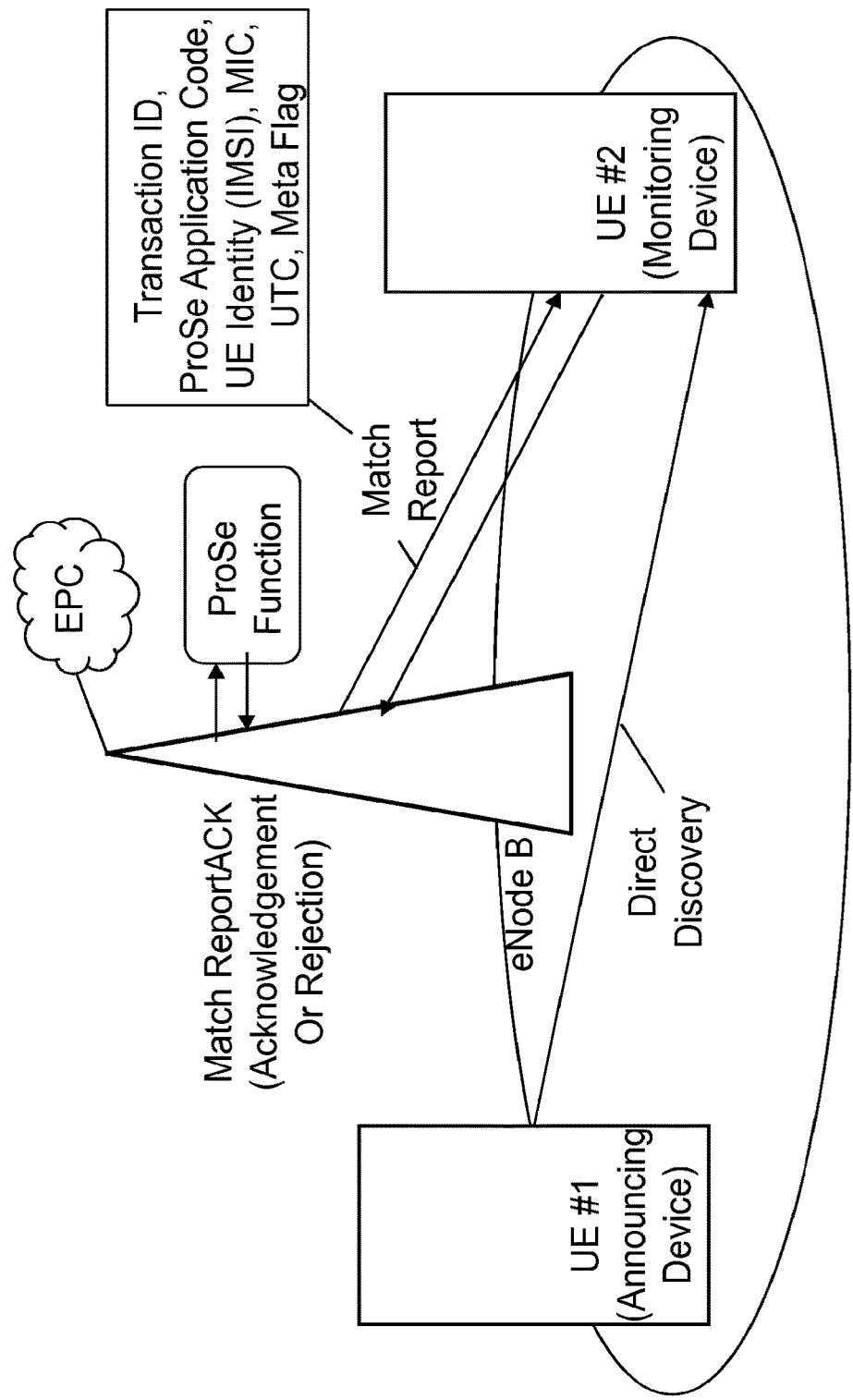

Consequently as a more generic approach, exemplary embodiments of the present invention can also be used for a more generic mechanism to not send any traffic of a particular traffic up to the application in view of that according to the existing approaches with respect to MEC only all or nothing principle is be applied to the underlying traffic (see e.g. FIG. 12, showing a schematic diagram illustrating exemplary scenarios of applications hosted on an eNB, and in particular a traffic offload type, according to which the traffic is always forwarded up to the MEC platform).

In modification of exemplary embodiments of the present invention, the V2X communication may also take place directly between the cars without the mobile network at all.

According to exemplary embodiments of the present invention, and due to the separation of the V2X application into control plane and user plane processing time of the payload is decreased significantly, and a more central placement of the V2X server application away from the eNB (RAN) is allowed. Accordingly, exemplary embodiments achieve cost efficiency compared with an approach where the V2X application is placed close to the eNB.

According to further exemplary embodiments of the present invention, the control plane of the V2X application may be implemented as application function (AF) such that the PCEF/PGW (potentially also decomposed into separated control plane (PGW-C) and user plane (PGW-U)) is instructed via the policy charging and rules function (PCRF) to detect and duplicate/forward the corresponding CAMs and DENMs to multiple destinations.

Figure 16:
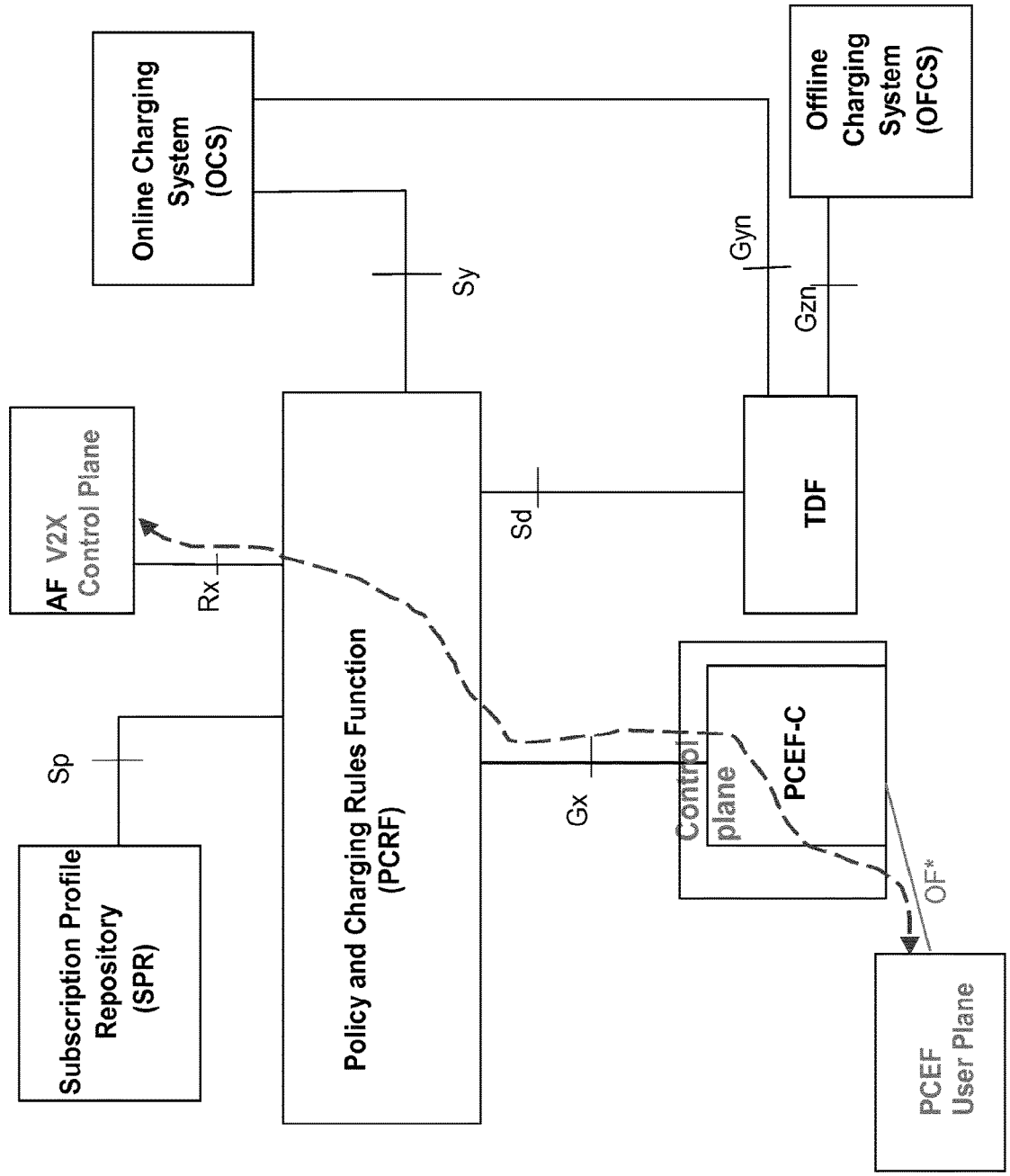
FIG. 16 shows a schematic diagram illustrating an exemplary policy and charging control logical architecture according to exemplary embodiments of the present invention.

FIG. 16 shows a schematic diagram illustrating an exemplary policy and charging control logical architecture according to exemplary embodiments of the present invention. In particular, according to FIG. 16, a modified logical architecture is depicted, when a subscription profile repository (SPR) is used.

According to exemplary embodiments of the present invention, the V2X control plane application, the PCRF, and the PCEF control plane may be located in the same cloud, whereas the PCEF user plane may reside outside the cloud.

As already mentioned above, the vehicle-to-vehicle communication application is a preferable implementation scenario for exemplary embodiments of the present invention.

However, exemplary embodiments of the present invention are applicable to further services and applications as well.

For example, gaming applications and "Broadband Access in a Crowd" conceivable as further implementations.

Namely, according to further exemplary embodiments of the present invention, gaming application layers are separated accordingly such that the user plane traffic is not unnecessarily sent up to the gaming server application. Accordingly, precious time can be saved, thereby for example increasing gamer's experience.

While in the foregoing, OpenFlow is mentioned as an SDN protocol, this is not to be understood as being limiting. For example, IETF ForCes (forwarding and control element separation) may also be used.

According to exemplary embodiments of the present invention, in general, the MEC application may be split accordingly into user plane and control plane. Furthermore, according to exemplary embodiments of the present invention, V2X application control plane resides on the eNB site, such that from this location the distributed V2X user plane is controlled as well as if the V2X application control plane would be placed for example in the cloud.

Because of the separation of the V2X application into control plane and user plane according to exemplary embodiments of the present invention, the V2X server application control plane part may be placed in a more centralized data center, however the user plane part of the V2X server application can be placed more close to the origin of the car-to-car (V2V, V2X) communication.

Since, this user plane does not need to forward the V2X car-to-car communication up to the server (but it may), but forwards it directly to the car(s), user plane delay can be minimized. In other words, according to exemplary embodiments of the present invention, the overall delay of the car-to-car communication is decreased, while it is still possible to inform the V2X server application about relevant information. In addition, the approaches according to the present invention fit well into the 5G environment of 3GPP where the separation of user plane and control plane is addressed in CUPS (control and user plane separation, 4G) and NextGen (5G)) to take further advantage of the flexible placement of the user plane, by preferably placing the user plane part of the V2X server application also on the PCEF-U/PGW-U of 4G/5G.

According to exemplary embodiments of the present invention, in general terms, the ForCes and OpenFlow protocols may be modified such that any application may be able to suppress the forwarding of particular application traffic in total or in part up to the application. Accordingly, V2X applications, gaming applications, "Broadband Access in a Crowd" applications, and in general any MEC application riding on the MEC platform, may or may not require to be notified completely about the whole traffic, and this requirement may be respectively fulfilled by exemplary embodiments of the present invention for either of these applications.

In more specific terms, according to exemplary embodiments of the present invention, at least three options for implementing the separation of the existing V2X application control plane and user plane parts by means of SDN are possible.

According to a first option ("direct"), the V2X control plane application is located in the distributed cloud/eNB site and has access to the V2X user plane at the transport layer (inside (preferred, to not unnecessarily increase the TCO) or outside the PGW-U, BRAS, successor of PGW-U in 5G environment).

According to a second option ("MEC based"), the V2X control plane application is located in the distributed cloud and has access to the V2X user plane at the transport layer (inside or outside the PGW-U, BRAS, successor of PGW-U) via the MEC platform (enabled to support SDN API).

According to a third option ("PCRF based"), the V2X control plane application is located in the distributed cloud and has access to the V2X user plane at the transport layer (inside PGW-U, BRAS, successor of PGW-U) via the PCRF (enabled to support SDN API) and/or via the PGW-C.

According to all three options according to exemplary embodiments of the present invention, the particular V2X control signaling is terminated at the V2X application control part, which is evaluated by service logic. Depending on the outcome of this evaluation, new SDN signaling is triggered to be sent to the V2X application user plane part. The V2X application user plane part receives the new instructions and applies the new rules to the user plane packets related to e.g. the V2X application. The other intermediary entities (like the MEC platform and the PCRF) need, at least, to be transparent for the signaling from/to the V2X control plane application and V2X user plane, and vice versa.

The following table recite the protocol stacks for DENM and CAM messages.

| Protocol | DENM | Protocol | CAM |
|---|---|---|---|
| DENM | ETSI EN 302 637-3 | CAM | ETSI EN 302 637-2 |
| BTP | ETSI EN 302 636-5-1 | BTP | ETSI EN 302 636-5-1 |
| UDP/TCP | ETSI TS 102 636-3, ETSI EN 302 665, RFC 768, RFC 793 | UDP/TCP | ETSI TS 102 636-3, ETSI EN 302 665, RFC 768, RFC 793 |
| IP | ETSI TS 102 636-3, ETSI EN 302 665, RFC 791 | IP | ETSI TS 102 636-3, ETSI EN 302 665, RFC 791 |

Here, the EN 302 637-2 defines the station identifier and the reference position in the basic container (Annex A) for CAM.

In the following, a procedure for first option according to exemplary embodiments of the present invention is explained for the CAM scenario.

In this regard, it is noted that similar procedures are possible for DENM (and signal phase and timing (SPAT), in-vehicle information (IVI), and MAP (which means topological map data, e.g. a geographical representation of the vicinity of a traffic light)).

According to the first option, the V2X control plane application riding on top of the SDN controller (directly) attached (or via PCRF or MEC) for instance to the PGW-U instructs the PGW-U via e.g. Open Flow to forward the first occurrence of a CAM packet in the BTP protocol on top of UDP/TCP on top of IP to the V2X control application via the SDN controller. Unknown packets (no rule instantiated yet at the user plane) are to be notified to the controller such that the controller can instruct the user plane based on new event/information. Such occurrence may mean that no V2X message has been exchanged, as the corresponding new car is entering the area of this V2X control application right now.

In order to limit the number of packets sent to the server application, the control plane entity may pre-configure a rule in the user plane entity such that only those packets from a new IP address are sent up, which simultaneously also carry the BTP protocol and/or the CAM message as payload. Corresponding new matching rules are enabled in the Open-Flow protocol.

Therefore this new vehicle, its IP address and a station ID is not known to the V2X application yet, but the "Packet IN message" of the OpenFlow protocol informs the SDN control plane entity, which notifies the V2X application.

The V2X control plane application inspects the "Packet IN message" and retrieves the IP/port address B of this new vehicle from the IP/TCP/UDP layer and the station ID and a reference position from the BTP/CAM layer.

The application (control plane) creates an entry in its database (external or internal) for IP/port address, station ID and reference position (i.e. geographic location) to the area of responsibility in question for which this CAM message is valid. According to ETSI EN 302 636-4-1, the maximum geographic area may up to 10 $km^2$ (corresponds to a circle with the diameter of about 3.5 km). As it is anticipated that V2X control plane application implementing embodiments of the present invention may be about 40 km to 80 km away from an eNB, the V2X control plane application implementing embodiments of the present invention may be responsible for up to about 500 geographic areas.

That means that the V2X control plane application according to exemplary embodiments of the present invention stores and knows all the cars within a certain area of responsibility (serviced area).

Based on this knowledge, the V2X control plane application checks whether there are other cars in this area. If so, the application instructs the SDN controller via a Northbound interface to a) forward all CAM message sent from those other vehicles to the newly arrived vehicle B, by sending OpenFlow "Flow Mod" message down to their corresponding PGW-Us instructing (additionally) to forward the CAMs for instance from IP address A, IP address C and IP address D to the IP address of the new vehicle B, and b) forward all CAM message sent from the vehicle B to all the other vehicles, by sending OpenFlow "Flow Mod" message down to the corresponding PGW-U instructing (additionally) to forward the CAM messages for instance from IP address B to the IP address C and IP address D and A of the other vehicles.

Alternatively, according to further exemplary embodiments of the present invention, the application may be informed via explicit registration of each vehicle entering the area (of responsibility/service). In case the car is leaving the area of responsibility, the V2X application removes the entry in the database.

The application recognizes that a particular car/vehicle/participant (may also be a person/pedestrian/lorry etc.) does not send any CAM/DENM anymore.

Here it is noted that besides that the user plane entity is instructed to duplicate and forward the corresponding message to the participants in the area of responsibility/concern, according to exemplary embodiments of the present invention, the user plane entity may also be instructed to transmit the messages also to the control plane entity such that the control plane entity (control plane part of application) is made aware about the circumstances of the participants (entering, leaving the area in question).

In order to limit the number of exchanged signaling messages, according to exemplary embodiments of the present invention, the control plane entity may instruct the user plane entity to throttle the message to only a percentage of the actually received messages, for example to a tenth part of the number of messages.

Alternatively, according to further exemplary embodiments of the present invention, the application (control plane) may be informed by an explicit registration and/or deregistration message of the participants.

In the following, concrete examples of embodiments of the present invention and respective impacts are explained.

Impact on V2X application control plane part:

On receipt of a registration or CAM or DENM message of a V2X client (e.g. car, pedestrian) at the V2X control plane application, the control part extracts for instance the station identifier (identifying the car, lorry, pedestrian, etc.), the message ID, the reference position (to identify the area of concern) and the IP address (or for example MAC address if layer 2 switching is used in another protocol and/or application), and instructs the e.g. OpenFlow part to send a "Flow Mod" message with the new information elements to the user planes of participants within the responsible area to duplicate/multiply the CAM message. For instance, the V2X application checks within which area the new car is moving, and retrieves the participant's stationsID and IP addresses, etc. from the database and prepares to instruct the corresponding PGW-U.

It is noted that instead of completely sending the CAM/DENM up to the V2X control plane in full application, the V2X application may instruct the user plane to simply only extract the station ID, the message type, the reference position and the IP port/address and/or the MAC address and send them up to the control plane in a new "Packet-IN" or OpenFlow "Notification".

An exemplary OpenFlow "Flow Mod" may be structured as follows:
OpenFlow FlowMod
MessageID: messageID INTEGER cam(2),
Station Identifier: StationID::=INTEGER(0 . . . 4294967295), together with
  the already known IP address/port and MAC address of each of the originator stations, and
  the already known IP address/port and MAC address of the new participating station.

Similar, the control plane sends an OpenFlow "Flow Mod" message to the user plane of the new car/pedestrian (new participant) to allow the forwarding of the CAM sent by the remote participants.

Furthermore an OpenFlow "Flow Mod" message is sent to the user plane responsible for the new participant instructing to forward the CAM to the other already participating stations.

It is to be noted that the control plane entity of another application may instruct the user plane to not send any messages up to the controller and may wish to keep messages at the transport level simply letting the user plane forward the packets to their destination. Furthermore the application may not instruct the user plane not to duplicate packets/messages.

Impact on PGW-U (or SGW-U or 5G-U or BRAS-U)/Impact on V2X Application user plane part:

On receipt of an OpenFlow "Flow Mod" message with the new information elements station identifier (identifying the car, lorry, pedestrian, etc.), message ID and the IP address (MAC address, etc.) at the user plane, the user plane installs the forwarding rules such that the CAM of the participating stations are duplicated to the new participant as follows.
OpenFlow FlowMod
MessageID: messageID INTEGER cam(2),
Station Identifier: StationID::=INTEGER(0 . . . 4294967295) together with
  the already known IP address/port and MAC address of the originator stations, and
  the already known IP address/port and MAC address of the new participating station.

Similar, the user plane of the new participant forwards/duplicates the CAM message of the new participant to the already participating stations.

It is noted that station ID may for example be replaced by any other ID which is able to identify a particular station or user in that protocol in question, for instance IMSI, IMEI, etc.

It is further noted that reference position is an example for a parameter describing a particular geographical location may for example be replaced by any other ID/parameter with such ability, for instance CellID, city name, etc.

Impact on MEC:

In case the V2X application resides on top of the MEC platform, according to exemplary embodiments of the present invention, the separated V2X control plane application is enabled to register itself as an application with the MEC platform, which is split into control plane and user plane as well. For that, the MEC platform is augmented to support the registration of OpenFlow based applications. Furthermore, the MEC platform incorporates an SDN controller or allows to register an SDN controller as an application. But regardless of the implementation of the SDN controller, the V2X control application registers with the (integrated or not) SDN controller.

Figure 17:
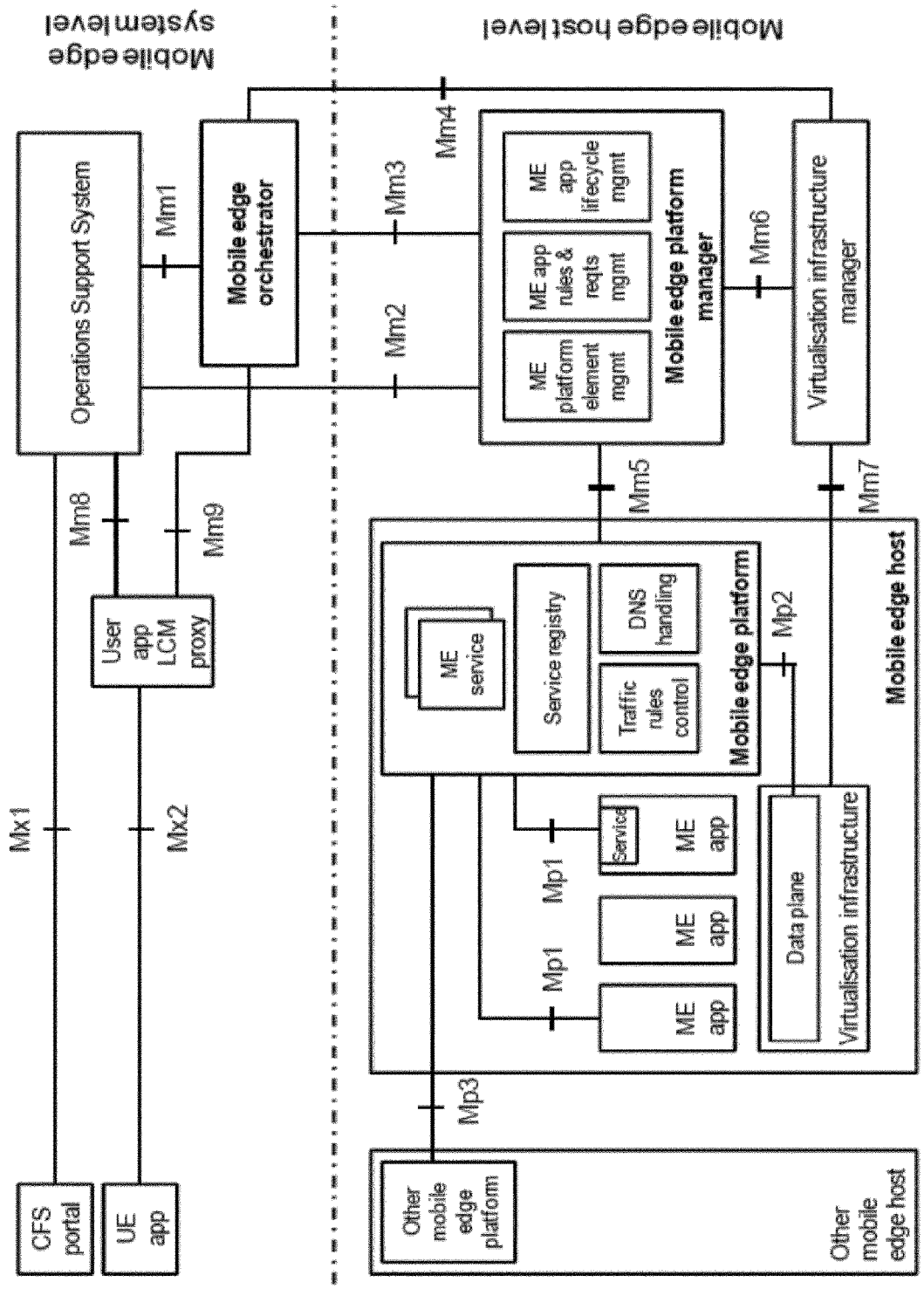
FIG. 17 shows a schematic diagram illustrating a mobile edge computing system according to exemplary embodiments of the present invention.

Furthermore the V2X user plane part (e.g. PGW-U) registers with the SDN controller within or outside the MEC platform via e.g. OpenFlow. Preferably, the PGW-U is located in the transport network and is not residing within the cloud where the MEC platform resides. For instance, an Mp2 interface may be Southbound/OpenFlow protocol where additionally the "data plane" as depicted in FIG. 17 (showing a schematic diagram illustrating a mobile edge computing system according to exemplary embodiments of the present invention) is preferably located in the transport network instead of being within the mobile edge host.

For instance, according to exemplary embodiments of the present invention, the MEC receives and sends OpenFlow messages like "HELLO, Packet_IN" messages and/or "Packet-OUT" and "Flow Mod" messages with at least the information elements as discussed above between the user plane part and the control plane part. Similarly, also Rx and Gx Interfaces (both DIAMETER based) may be supported as well to provide a seamless interworking.

Impact on PCRF:

In case the V2X application resides on top of the PCRF via the Rx interface, the Rx and Gx (both DIAMETER based), and the PCRF is augmented with at least the new information elements for the OpenFlow protocol as described above (e.g. CAM, station ID, IP port/addr, MAC etc.). Additionally, the PCRF may forward the new information elements from the Rx interface via the Gx interface to the PGW-C part (or even directly to the PGW user plane part) and from the Gx interface via the Rx interface from the PGW-C part (or even directly to the PGW user plane part) to the V2X application control plane part.

According to exemplary embodiments of the present invention, the PCRF is administrated to contact/register with the new V2X application via Rx, which may include, for example, sending the to be installed rules down to V2X user plane part and sending the registration message or DENM/CAM messages or parts thereof up to the V2X control application.

It is noted that the PGW might or might not be separated into a user plane part and a control plane part. However, from the V2X and the PCRF point of view this may not matter as long the Rx and Gx interface is enabled to carry the needed information elements.

Impact on PGW-C:

In case the V2X application resides on top of the PCRF via the PGW-C via the Gx interface, the Gx and Southbound interface/OpenFlow of the PGW-C is augmented at least with the new information elements for the OpenFlow protocol as described above (e.g. Area (geographic location), CAM, station ID, IP port/addr, MAC, etc.). Additionally, the PGW-C may forward the new information elements from the Gx interface via the OpenFlow interface to the PGW-U part. Messages received on the OpenFlow interface from the PGW-C are forwarded via the Gx interface to the PCRF.

This may include, for example, sending the rules to be installed down to V2X user plane part and sending the registration message or DENM/CAM messages or parts thereof up to the PCRF.

It is noted that the PGW might or might not be separated into a user plane part and a control plane part. However, from the V2X and the PCRF point of view this may not matter as long the Rx and Gx interface is enabled to carry the needed information elements.

According to exemplary embodiments of the present invention, the PGW-C is administrated to contact/register/consult with the new V2X application via the PCRF. That means that the PGW-C and PCRF are enabled to register with the V2X application.

While in the foregoing, the OpenFlow is used as an example for an interface between the control plane and the user plane, alternatively, for example ForCes GTP-C protocol or the Diameter protocol may be used for that purpose.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network element/entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

In FIG. 18, an alternative illustration of apparatuses according to exemplary embodiments of the present invention is depicted. As indicated in FIG. 18, according to exemplary embodiments of the present invention, the apparatus (user plane entity) 10' (corresponding to the user plane entity 10) comprises a processor 181, a memory 182 and an interface 183, which are connected by a bus 184 or the like. Further, according to exemplary embodiments of the present invention, the apparatus (control plane entity) 30' (corresponding to the control plane entity 30) comprises a processor 185, a memory 186 and an interface 187, which are connected by a bus 188 or the like. Further, according to exemplary embodiments of the present invention, the apparatus (intermediate network entity) 50' (corresponding to the intermediate network entity 50) comprises a processor 191, a memory 192 and an interface 193, which are connected by a bus 194 or the like, and the apparatuses may be connected via link 189, respectively.

The processor 181/185/191 and/or the interface 183/187/193 may also include a modem or the like to facilitate communication over a (hardwire or wireless) link, respectively. The interface 183/187/193 may include a suitable transceiver coupled to one or more antennas or communication means for (hardwire or wireless) communications with the linked or connected device(s), respectively. The interface 183/187/193 is generally configured to communicate with at least one other apparatus, i.e. the interface thereof.

The memory 182/186/192 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the user plane entity 10 comprises at least one processor 181, at least one memory 182 including computer program code, and at least one interface 183 configured for communication with at least another apparatus. The processor (i.e. the at least one processor 181, with the at least one memory 182 and the computer program code) is configured to perform receiving (by a user plane entity of an inter mobile device information exchange service) from a control plane entity of said service hosting management functionality for said service, a forwarding rule for forwarding messages related to said service between participants of said service, wherein said user plane entity is located in a connection path between said control plane entity and a first participant of said service and in a connection path between said control plane entity and a second participant of said service (thus the apparatus comprising corresponding means for receiving), to perform storing said forwarding rule in a rule storage, wherein each of forwarding rules stored in said rule storage is indicative of forwarding messages related to said service from a respective sender participant of said service to a respective receiver participant of said service (thus the apparatus comprising corresponding means for storing), to perform receiving a message from said first participant of said service, said message being indicative of said first participant of said service and said service, to perform deciding whether to forward said message to said second participant of said service based on said forwarding rule (thus the apparatus comprising corresponding means for deciding), and to perform forwarding, upon affirmative result of said deciding, said message to said second participant of said service (thus the apparatus comprising corresponding means for forwarding).

The apparatus representing the user plane entity 10 may further comprise means for comparing, means for determining, means for removing, and/or means for checking.

Further, according to exemplary embodiments of the present invention, an apparatus representing the control plane entity 30 comprises at least one processor 185, at least one memory 186 including computer program code, and at least one interface 187 configured for communication with at least another apparatus. The processor (i.e. the at least one processor 185, with the at least one memory 186 and the computer program code) is configured to perform maintaining (by a control plane entity of an inter mobile device) information exchange service hosting management functionality for said service, information on a plurality of participants of said service in a service area (thus the apparatus comprising corresponding means for maintaining), to perform generating a forwarding rule indicative of forwarding messages related to said service from a sender participant of said plurality of participants to a receiver participant of said plurality of participants based on said information on said plurality of participants of said service in said service area (thus the apparatus comprising corresponding means for generating), and to perform transmitting said forwarding rule to a user plane entity of said service, wherein said user plane entity is located in a connection path between said control plane entity and said first participant of said service and in a connection path between said control plane entity and said second participant of said service (thus the apparatus comprising corresponding means for transmitting).

The apparatus representing the control plane entity 30 may further comprise means for receiving, means for creating, means for checking, means for adding, and/or means for monitoring.

Further, according to exemplary embodiments of the present invention, an apparatus representing the intermediate network entity 50 comprises at least one processor 191, at least one memory 192 including computer program code, and at least one interface 193 configured for communication with at least another apparatus. The processor (i.e. the at least one processor 191, with the at least one memory 192 and the computer program code) is configured to perform receiving, from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service (thus the apparatus comprising corresponding means for receiving), and to perform transmitting a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service (thus the apparatus comprising corresponding means for transmitting).

For further details regarding the operability/functionality of the individual apparatuses, reference is made to the above description in connection with any one of FIGS. 1 to 17, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for efficient and dynamic support of mobile low latency services. Such measures exemplarily comprise receiving, by a user plane entity of an inter mobile device information exchange service, from a control plane entity of said service hosting management functionality for said service, a forwarding rule for forwarding messages related to said service between participants of said service, wherein said user plane entity is located in a connection path between said control plane entity and a first participant of said service and in a connection path between said control plane entity and a second participant of said service, storing said forwarding rule in a rule storage, wherein each of forwarding rules stored in said rule storage is indicative of forwarding messages related to said service from a respective sender participant of said service to a respective receiver participant of said service, receiving a message from said first participant of said service, said message being indicative of said first participant of said service and said service, deciding whether to forward said message to said second participant of said service based on said forwarding rule, and forwarding, upon affirmative result of said deciding, said message to said second participant of said service.

According to a further aspect, examples of embodiments concern a processing where the following is conducted, for example in connection with the part above described part "impact on V2X application control place part", especially the "OpenFlow FlowMod": identifying the message by using an IP address of said first participant and a message ID being different to said IP address, and applying said forwarding rule on the basis of said message ID and said IP address of said first participant for forwarding said message to said second participant.

According to a further aspect, examples of embodiments concern a processing where the following is conducted, for example in connection with the above described parts related to the V2X application: receiving a data packet from the first participant, said data packet comprising said message; identifying a type of said message on the basis of a message identification included in the payload of the received data packet, and selecting a forwarding rule on the basis of the identified type of the message.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations

3GPP 3rd Generation Partnership Project
AF application function
BTP basic transport protocol
C-ITS cooperative intelligent transport system
CAM collaborative awareness message
CP control plane, C-plane
D2D device-to-device
DENM decentralized environmental notification message
eNB evolved NodeB, eNodeB
IETF Internet Engineering Task Force
ITS Intelligent Transport Systems
IVI in-vehicle information
ForCes forwarding and control element separation
LTE Long Term Evolution
MEC mobile edge computing
PCEF policy and charging enforcement function
PCRF policy charging and rules function
PGW packet data network gateway, PDN-GW
ProSe proximity service
RACS radio applications cloud server
RAN radio access network
SDN software-defined networking
SPAT signal phase and timing
SPR subscription profile repository
TCO total cost of Ownership
UE user equipment
UP user plane, U-plane
V2V vehicle-to-vehicle
V2X Vehicle-to-X

The invention claimed is:

1. A method comprising
maintaining, by a control plane entity of an inter mobile device information exchange service hosting management functionality for said service, information on a plurality of participants of said service in a service area,
generating a forwarding rule indicative of forwarding messages related to said service from a sender participant of said plurality of participants to a receiver participant of said plurality of participants based on said information on said plurality of participants of said service in said service area, wherein said forwarding rule comprises a service identifier indicative of a belonging to said service, and
transmitting said forwarding rule to a user plane entity of said service, wherein said user plane entity is located in a connection path between said control plane entity and said first participant of said service and in a connection path between said control plane entity and said second participant of said service.

2. The method according to claim 1, further comprising
receiving a registration message for registration of a new participant to said service or a deregistration message for deregistration of a present participant from said service,
wherein, in case of said registration message being received, said generating comprises
creating at least one forwarding rule indicative of forwarding messages related to said service based on said new participant as said sender participant, and at least one forwarding rule indicative of forwarding messages related to said service based on said new participant as said receiver participant, and
wherein, in case of said deregistration message being received, said method further comprises
transmitting, to said user plane entity, a forwarding rule removal instruction identifying at least said present participant and being indicative of an instruction to remove forwarding rules related to said present participant.

3. The method according to claim 1, further comprising
receiving, from said user plane entity, a message related to said service indicative of an origin of said message, and
checking whether said origin of said message corresponds to an entry in said information on said plurality of participants of said service in said served area, and
when, as a result of said checking, said origin of said message does not correspond to an entry in said information on said plurality of participants of said service in said served area, the method further comprises
adding a new entry corresponding to said origin of said message to said information on said plurality of participants of said service in said served area, and said generating comprises
creating at least one forwarding rule indicative of forwarding messages related to said service based on said new entry as said sender participant, and at least one forwarding rule indicative of forwarding messages related to said service based on said new entry as said receiver participant.

4. The method according to claim 1, further comprising
monitoring, for each entry in said information on said plurality of participants of said service in said served area, a time elapsed from the last received message related to said service originated from said entry,
wherein, in case said time exceeds a predetermined period, said method further comprises
transmitting, to said user plane entity, a forwarding rule removal instruction identifying at least said entry and being indicative of an instruction to remove forwarding rules related to said entry.

5. The method according to claim 1, wherein
said inter mobile device information exchange service is one of a vehicle-to-X-communications service, a broadband access in a crowd service, and a service related to mobile gaming applications, or
said message is a cooperative awareness message or a decentralized environmental notification message, or
said service is indicated by a specific port, or
said forwarding rule is transported via one of an OpenFlow FlowMod message, an International Telegraph Union Telecommunication Standardization Sector gateway control protocol H.248, a control and user plane separation Sx interface, a policy and charging rules function Rx interface, a policy and charging rules function Gx interface, and a mobile edge computing Mp2 reference point, or
any of said sender participant of said plurality of participants and said receiver participant of said plurality of participants is indicated in said forwarding rule by a wildcard, or
said messages include at least one of information regarding a service area served by a serving station related to said service, a station identifier of said serving station, and a service identifier indicative of a belonging of said message to said service.

6. A method comprising
receiving, from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service, wherein said forwarding rule comprises a service identifier indicative of a belonging to said service, and
transmitting a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service.

7. An apparatus in a control plane entity of an inter mobile device information exchange service hosting management functionality for said service, the apparatus comprising at least one processor, and
at least one memory for storing instructions to be executed by the processor, wherein
the at least one memory and the instructions are configured to, with the at least one processor, cause the apparatus at least to perform
maintaining information on a plurality of participants of said service in a service area,
generating a forwarding rule indicative of forwarding messages related to said service from a sender participant of said plurality of participants to a receiver participant of said plurality of participants based on said information on said plurality of participants of said service in said service area, wherein said forwarding rule comprises a service identifier indicative of a belonging to said service, and
transmitting said forwarding rule to a user plane entity of said service, wherein said user plane entity is located in a connection path between said control plane entity and said first participant of said service and in a connection path between said control plane entity and said second participant of said service.

8. The apparatus according to claim 7, wherein the at least one memory and the instructions are configured to, with the at least one processor, cause the apparatus to further perform:
receiving a registration message for registration of a new participant to said service or a deregistration message for deregistration of a present participant from said service,
wherein, in case of said registration message being received, said generating comprises
creating at least one forwarding rule indicative of forwarding messages related to said service based on said new participant as said sender participant, and at least one forwarding rule indicative of forwarding messages related to said service based on said new participant as said receiver participant, and
wherein, in case of said deregistration message being received, said method further comprises
transmitting, to said user plane entity, a forwarding rule removal instruction identifying at least said present participant and being indicative of an instruction to remove forwarding rules related to said present participant.

9. The apparatus according to claim 7, wherein the at least one memory and the instructions are further to, with the at least one processor, cause the apparatus to further perform:
receiving, from said user plane entity, a message related to said service indicative of an origin of said message, and
checking whether said origin of said message corresponds to an entry in said information on said plurality of participants of said service in said served area, and
when, as a result of said checking, said origin of said message does not correspond to an entry in said information on said plurality of participants of said service in said served area, the method further comprises
adding a new entry corresponding to said origin of said message to said information on said plurality of participants of said service in said served area, and
said generating comprises
creating at least one forwarding rule indicative of forwarding messages related to said service based on said new entry as said sender participant, and at least one forwarding rule indicative of forwarding messages related to said service based on said new entry as said receiver participant.

10. The apparatus according to claim 7, wherein the at least one memory and the instructions are configured to, with the at least one processor, cause the apparatus to further perform:
monitoring, for each entry in said information on said plurality of participants of said service in said served area, a time elapsed from the last received message related to said service originated from said entry,
wherein, in case said time exceeds a predetermined period, said method further comprises
transmitting, to said user plane entity, a forwarding rule removal instruction identifying at least said entry and being indicative of an instruction to remove forwarding rules related to said entry.

11. The apparatus according to claim 7, wherein
said inter mobile device information exchange service is one of a vehicle-to-X-communications service, a broadband access in a crowd service, and a service related to mobile gaming applications, or
said message is a cooperative awareness message or a decentralized environmental notification message, or
said service is indicated by a specific port, or
said forwarding rule is transported via one of an OpenFlow FlowMod message, an International Telegraph Union Telecommunication Standardization Sector gateway control protocol H.248, a control and user plane separation Sx interface, a policy and charging rules function Rx interface, a policy and charging rules function Gx interface, and a mobile edge computing Mp2 reference point, or
any of said sender participant of said plurality of participants and said receiver participant of said plurality of participants is indicated in said forwarding rule by a wildcard, or
said messages include at least one of information regarding a service area served by a serving station related to said service, a station identifier of said serving station, and a service identifier indicative of a belonging of said message to said service.

12. An apparatus comprising
at least one processor, and
at least one memory for storing instructions to be executed by the processor, wherein
the at least one memory and the instructions are configured to, with the at least one processor, cause the apparatus at least to perform
receiving, from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service, wherein said forwarding rule comprises a service identifier indicative of a belonging to said service, and
transmitting a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service.

13. A computer program product, embodied on a non-transitory computer-readable medium, comprising program instructions that, when executed by a processing device, perform:
    maintaining, by a control plane entity of an inter mobile device information exchange service hosting management functionality for said service, information on a plurality of participants of said service in a service area,
    generating a forwarding rule indicative of forwarding messages related to said service from a sender participant of said plurality of participants to a receiver participant of said plurality of participants based on said information on said plurality of participants of said service in said service area, wherein said forwarding rule comprises a service identifier indicative of a belonging to said service, and
    transmitting said forwarding rule to a user plane entity of said service, wherein said user plane entity is located in a connection path between said control plane entity and said first participant of said service and in a connection path between said control plane entity and said second participant of said service.

14. The computer program product of claim 13, wherein the program instructions, when executed by the processing device further:
    receiving a registration message for registration of a new participant to said service or a deregistration message for deregistration of a present participant from said service,
    wherein, in case of said registration message being received, said generating comprises
    creating at least one forwarding rule indicative of forwarding messages related to said service based on said new participant as said sender participant, and at least one forwarding rule indicative of forwarding messages related to said service based on said new participant as said receiver participant, and
    wherein, in case of said deregistration message being received, said method further comprises
    transmitting, to said user plane entity, a forwarding rule removal instruction identifying at least said present participant and being indicative of an instruction to remove forwarding rules related to said present participant.

15. The computer program product of claim 13, wherein the program instructions, when executed by the processing device further:
    receiving, from said user plane entity, a message related to said service indicative of an origin of said message, and
    checking whether said origin of said message corresponds to an entry in said information on said plurality of participants of said service in said served area, and
    when, as a result of said checking, said origin of said message does not correspond to an entry in said information on said plurality of participants of said service in said served area, the method further comprises
    adding a new entry corresponding to said origin of said message to said information on said plurality of participants of said service in said served area, and
    said generating comprises
    creating at least one forwarding rule indicative of forwarding messages related to said service based on said new entry as said sender participant, and at least one forwarding rule indicative of forwarding messages related to said service based on said new entry as said receiver participant.

16. The computer program product of claim 13, wherein the program instructions, when executed by the processing device further:
    monitoring, for each entry in said information on said plurality of participants of said service in said served area, a time elapsed from the last received message related to said service originated from said entry,
    wherein, in case said time exceeds a predetermined period, said method further comprises
    transmitting, to said user plane entity, a forwarding rule removal instruction identifying at least said entry and being indicative of an instruction to remove forwarding rules related to said entry.

17. The computer program product of claim 13, wherein said inter mobile device information exchange service is one of a vehicle-to-X-communications service, a broadband access in a crowd service, and a service related to mobile gaming applications, or
    said message is a cooperative awareness message or a decentralized environmental notification message, or
    said service is indicated by a specific port, or
    said forwarding rule is transported via one of an Open-Flow FlowMod message, an International Telegraph Union Telecommunication Standardization Sector gateway control protocol H.248, a control and user plane separation Sx interface, a policy and charging rules function Rx interface, a policy and charging rules function Gx interface, and a mobile edge computing Mp2 reference point, or
    any of said sender participant of said plurality of participants and said receiver participant of said plurality of participants is indicated in said forwarding rule by a wildcard, or
    said messages include at least one of information regarding a service area served by a serving station related to said service, a station identifier of said serving station, and a service identifier indicative of a belonging of said message to said service.

18. A computer program product, embodied on a non-transitory computer-readable medium, comprising program instructions that, when executed by a processing device, perform a method comprising:
    receiving, from a control plane entity of an inter mobile device information exchange service hosting management functionality for said service, a first message related to said service, wherein the first message includes at least one of a forwarding rule indicative of forwarding messages related to said service from a sender participant of said service to a receiver participant of said service, information regarding a service area served by a serving station related to said service, a station identifier of said serving station, a participant identifier of a participant of said service, and a service identifier indicative of a belonging of said first message to said service, wherein said forwarding rule comprises a service identifier indicative of a belonging to said service, and transmitting a second message related to said service to a user plane entity of said service located in a connection path between said control plane entity and said sender participant of said service and in a connection path between said control plane entity and said receiver participant of said service, wherein the second message includes said at least one of said forwarding rule indicative of forwarding messages related to said service from said sender participant of said service to said receiver participant of said service, said information regarding said service area served by said serving station related to said service, said station identifier of said serving station, said participant identifier of said participant of said service, and said service identifier indicative of a belonging of said second message to said service.

* * * * *